Nov. 12, 1957  A. WIEBE  2,813,201
X-RAY INSPECTION APPARATUS
Filed Aug. 29, 1951  21 Sheets-Sheet 6
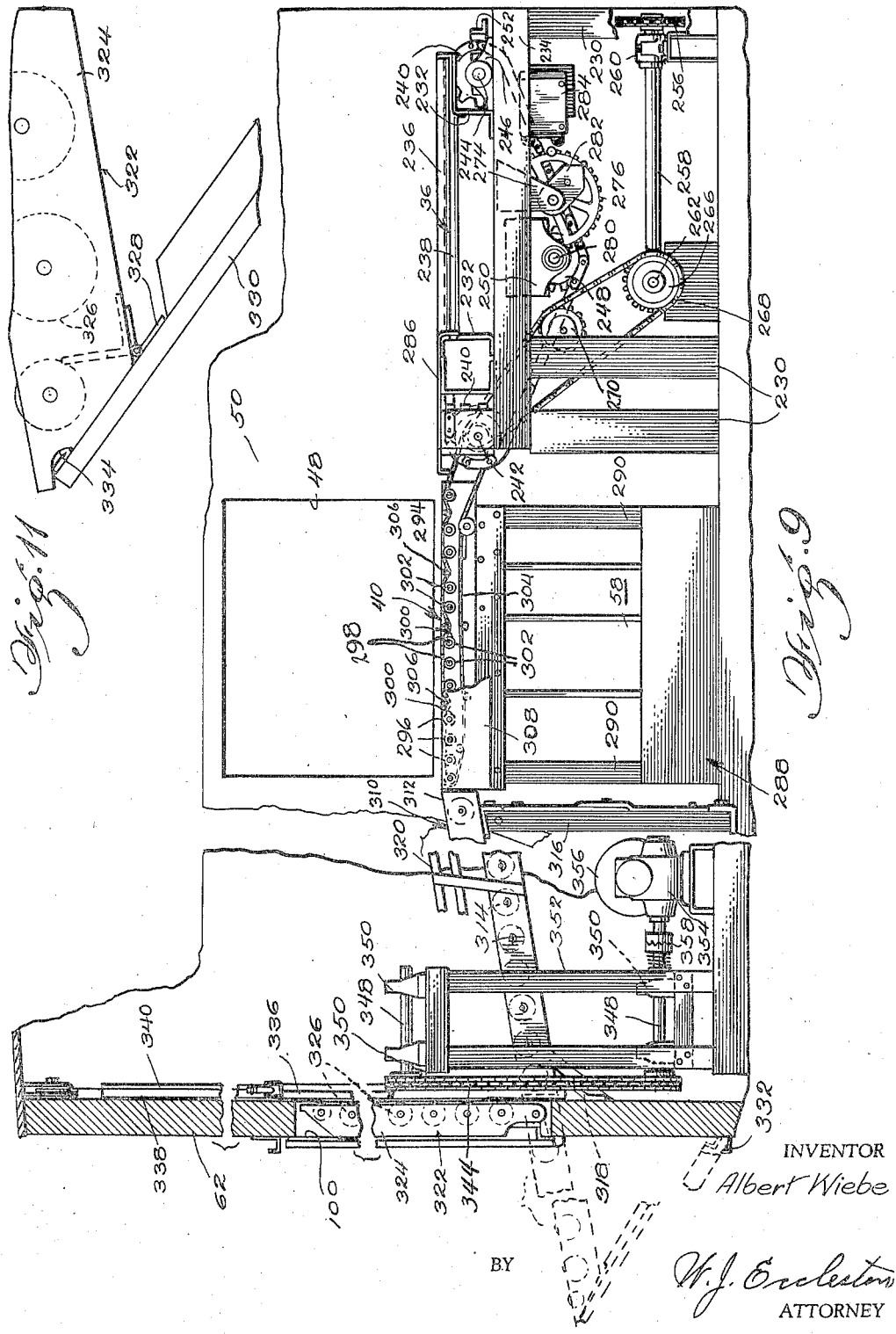
INVENTOR
Albert Wiebe
BY
W. J. Eccleston
ATTORNEY Nov. 12, 1957  A. WIEBE  2,813,201
X-RAY INSPECTION APPARATUS
Filed Aug. 29, 1951  21 Sheets-Sheet 7

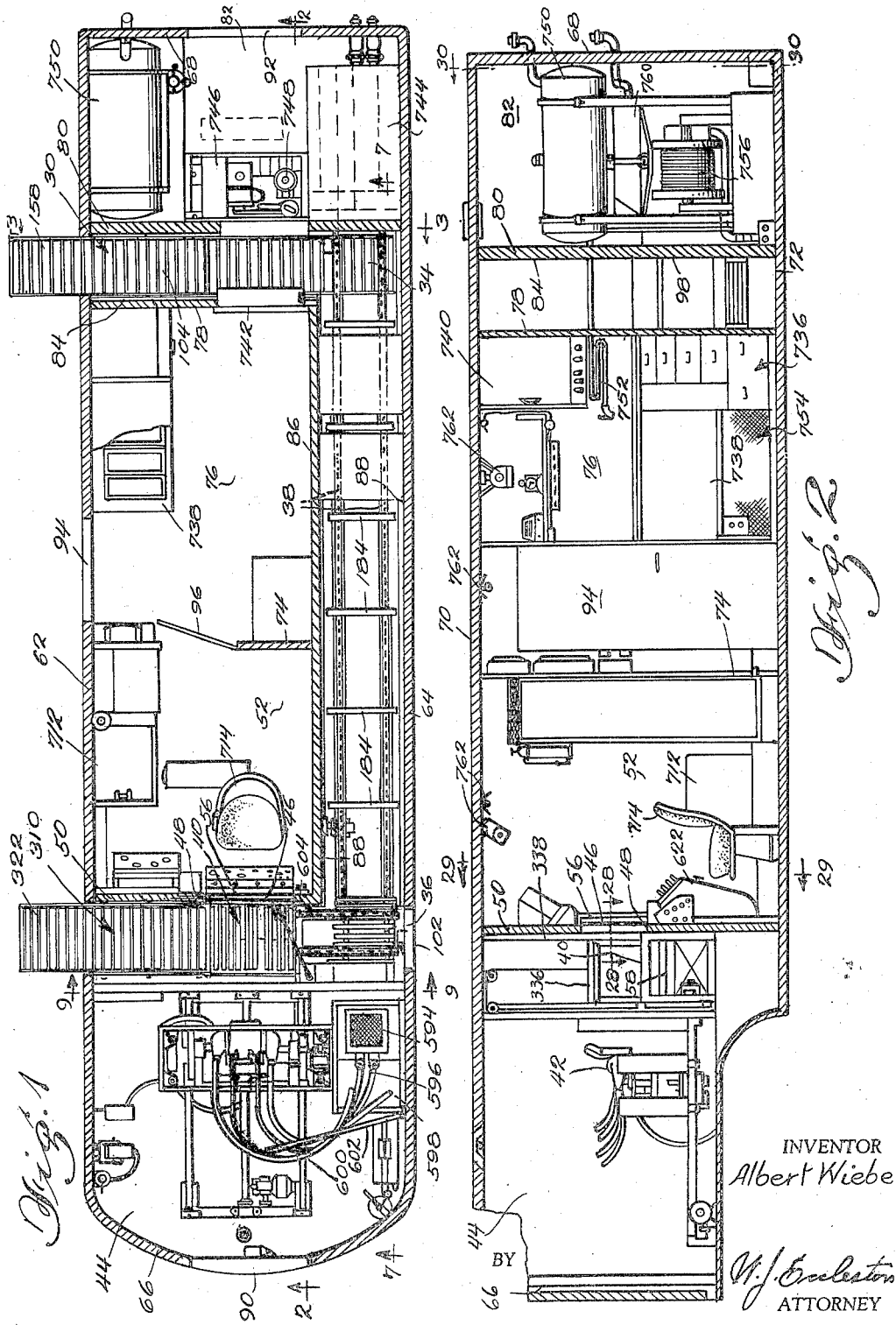

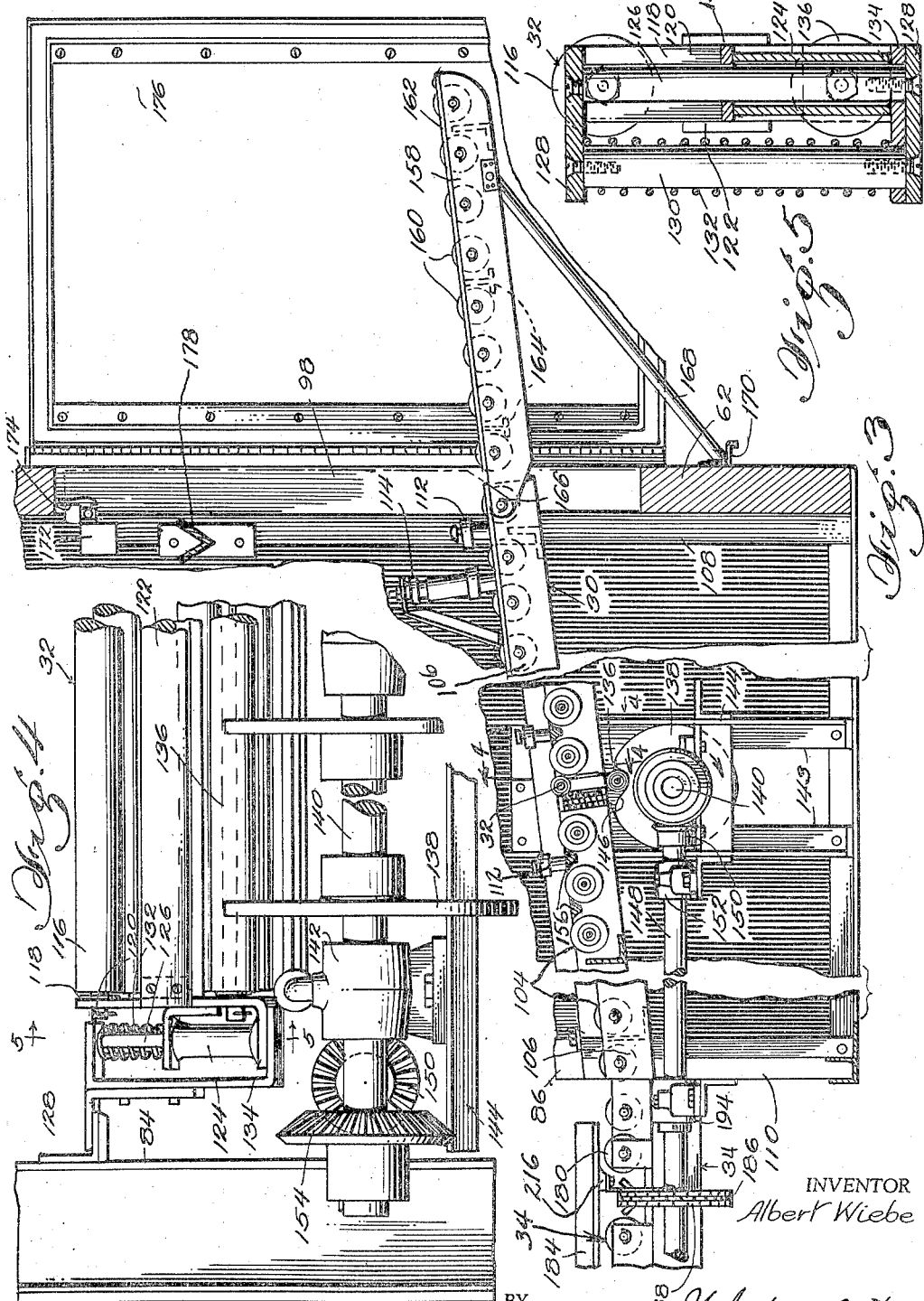

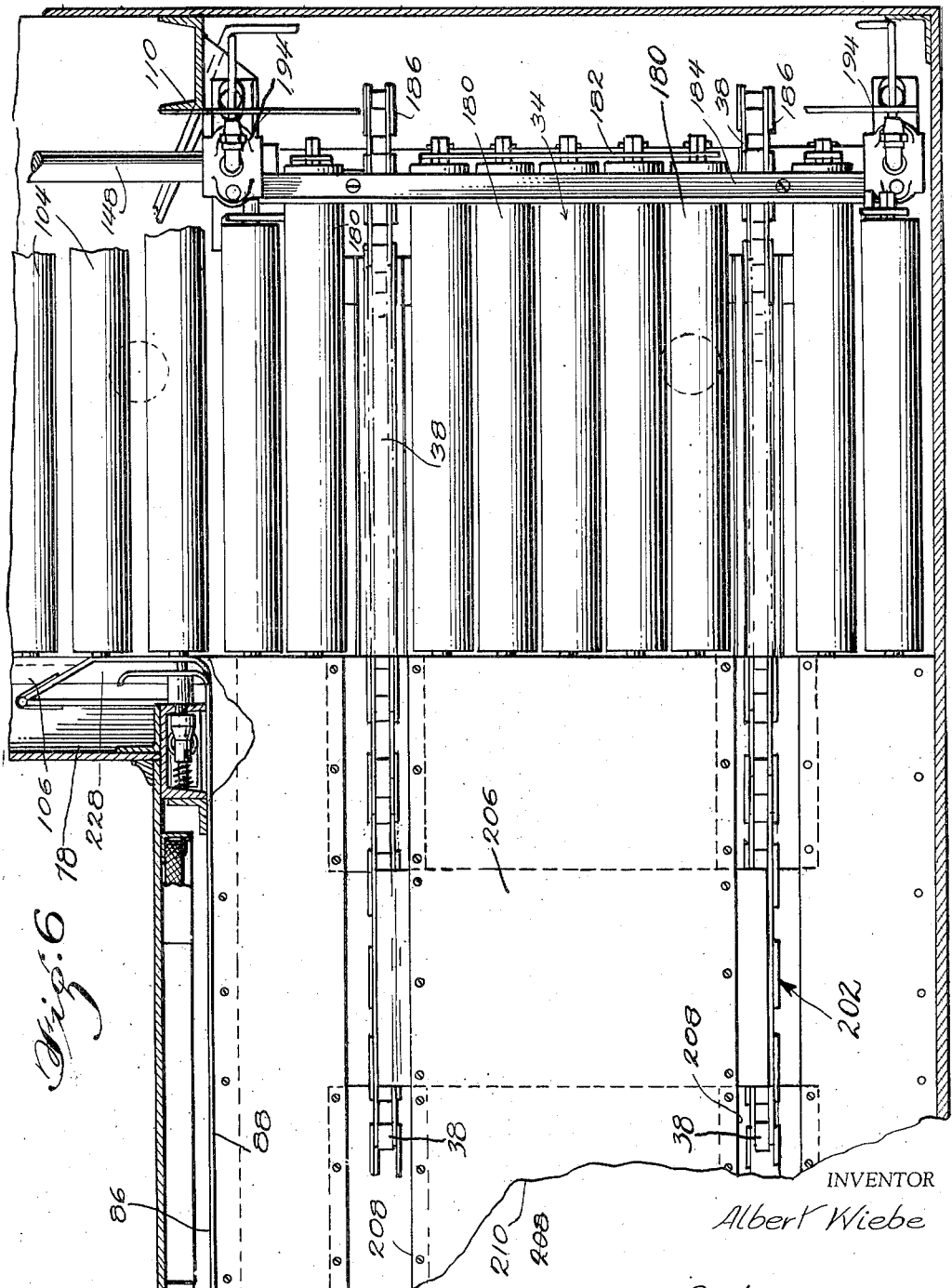

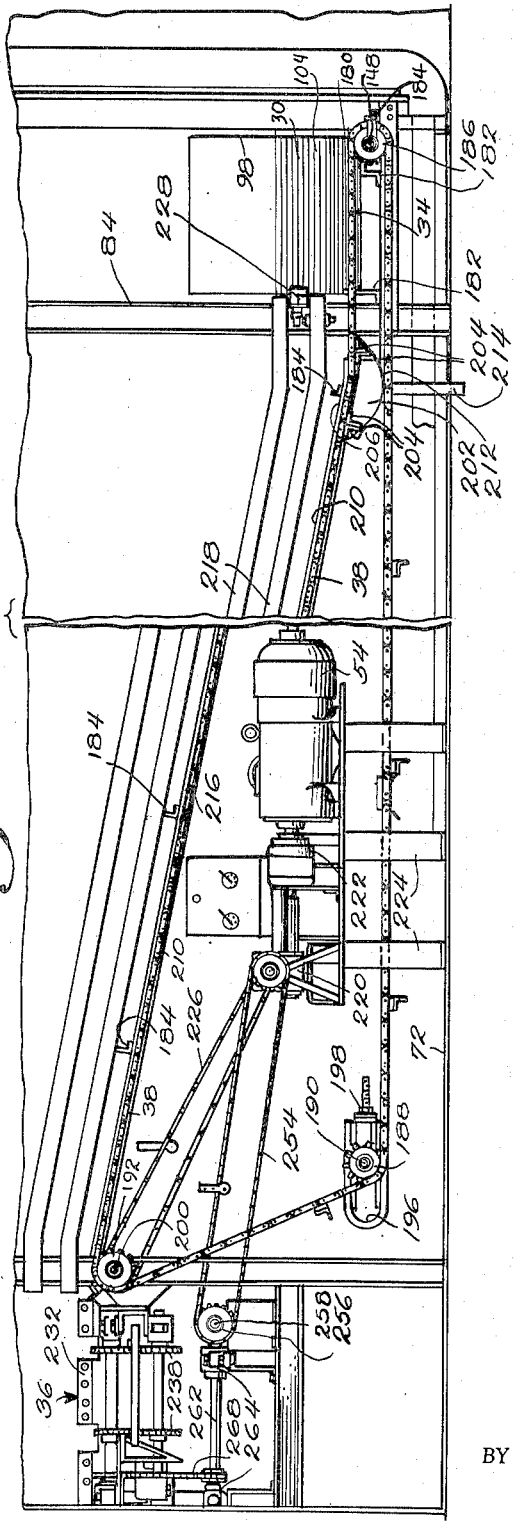

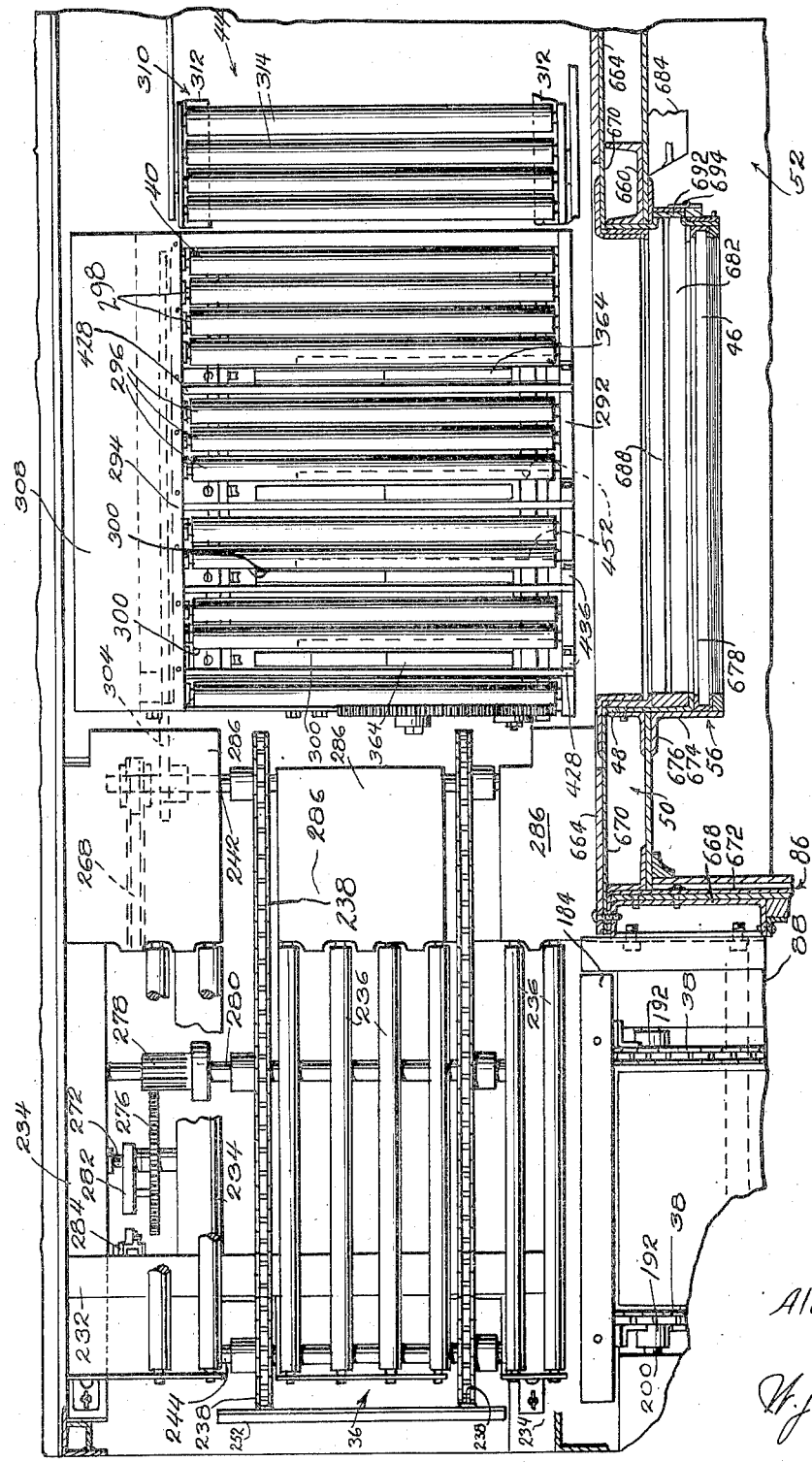

INVENTOR
Albert Wiebe

BY
W. J. Eccleston,
ATTORNEY

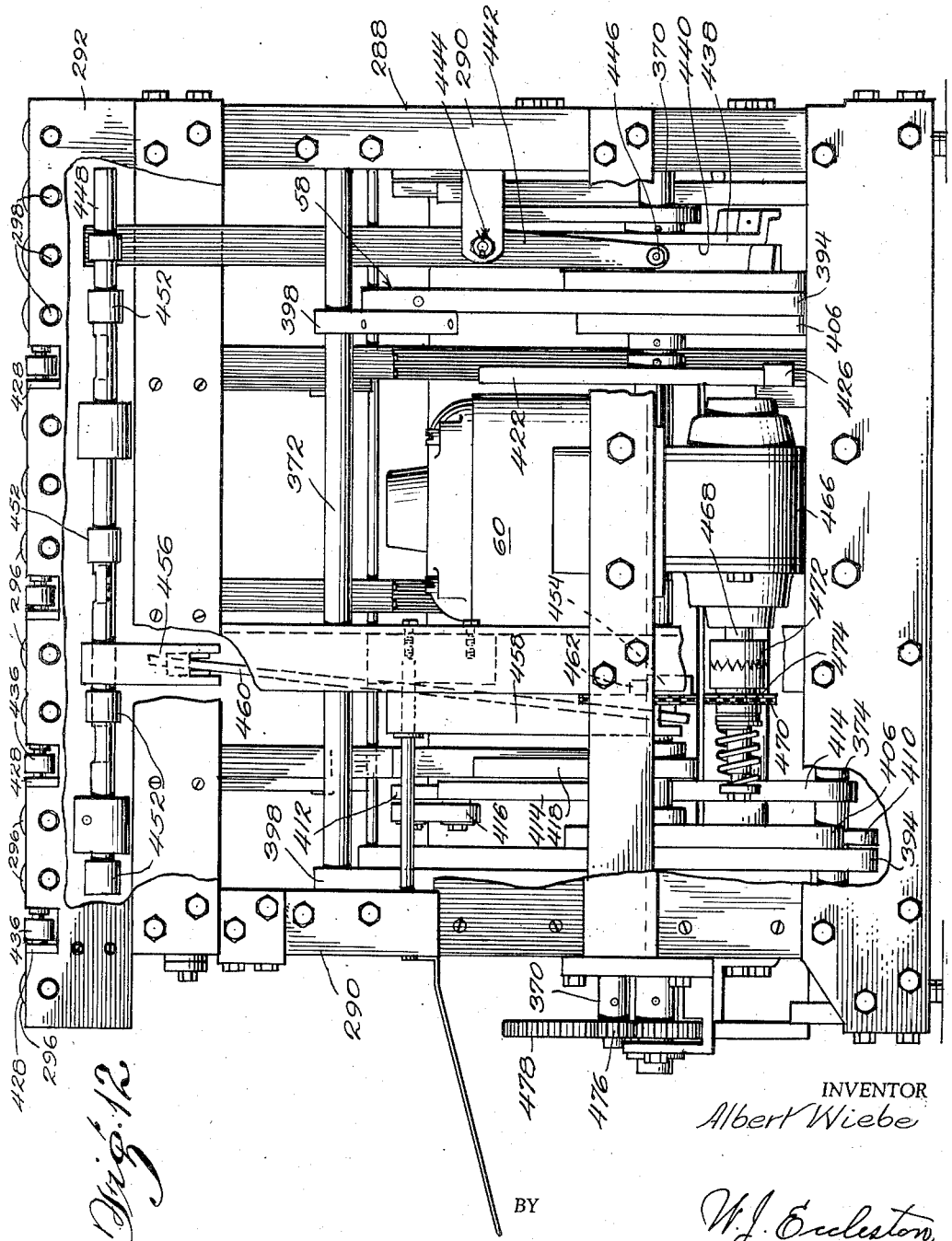

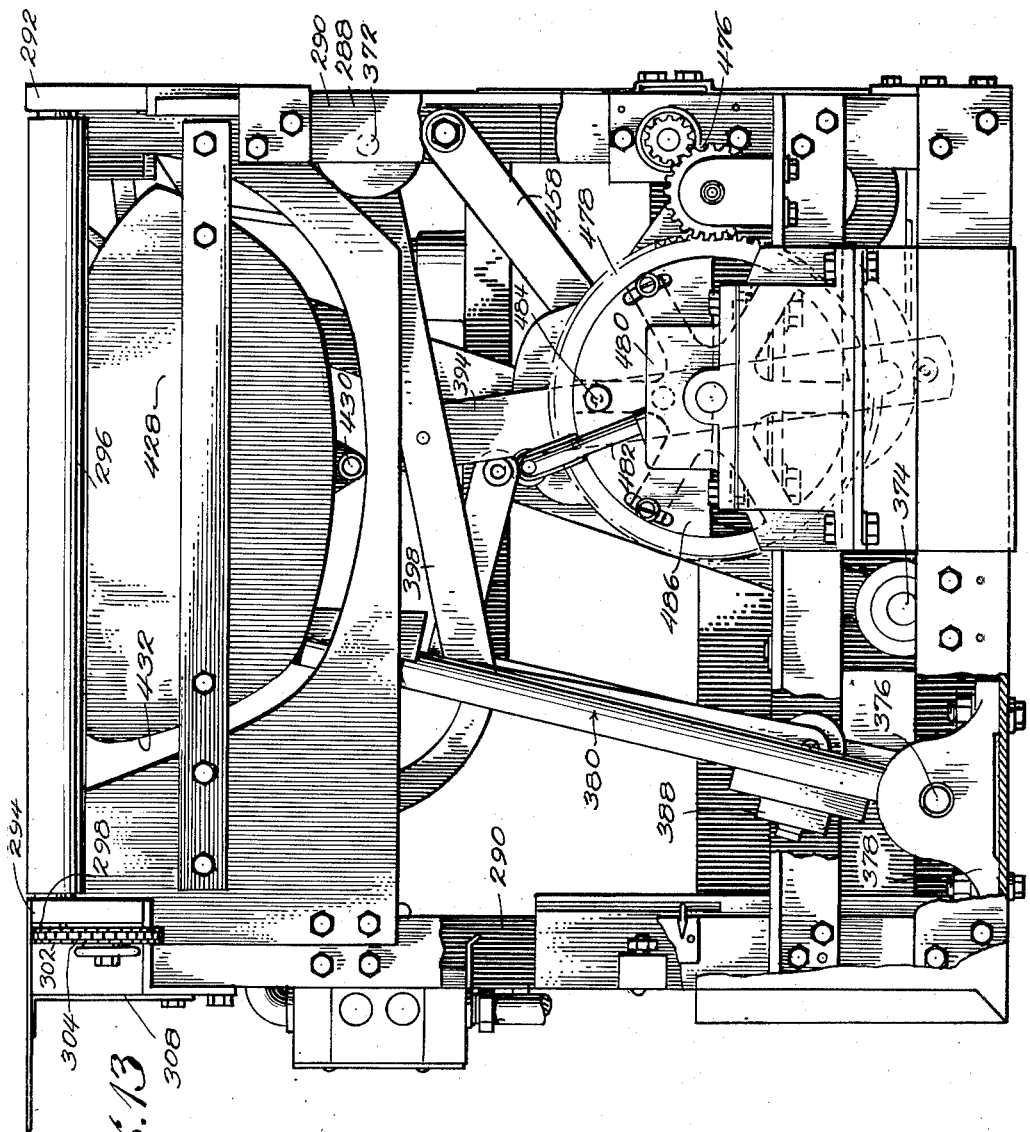

Nov. 12, 1957

A. WIEBE 2,813,201

X-RAY INSPECTION APPARATUS

Filed Aug. 29, 1951

INVENTOR
Albert Wiebe

BY
W. J. Eccleston
ATTORNEY

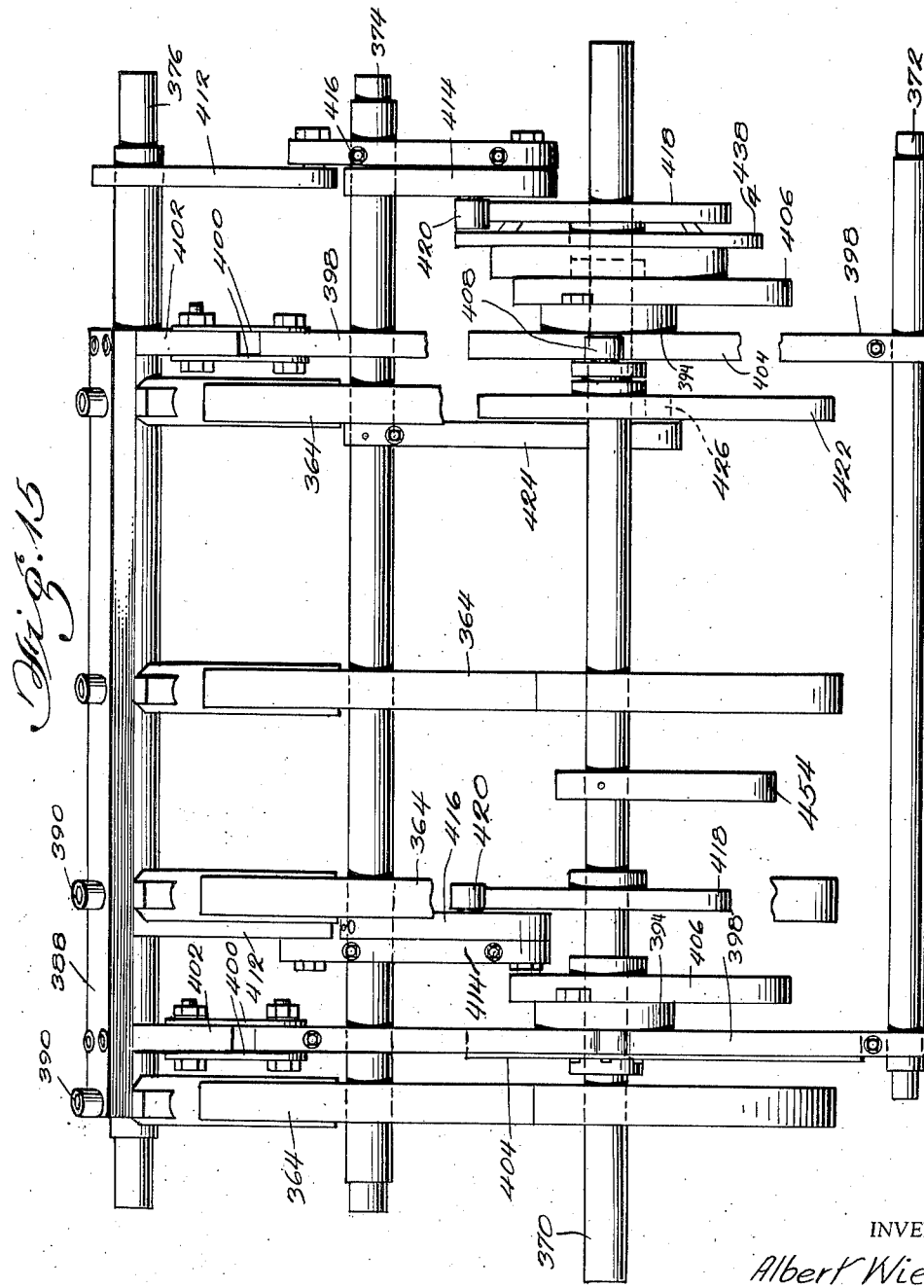

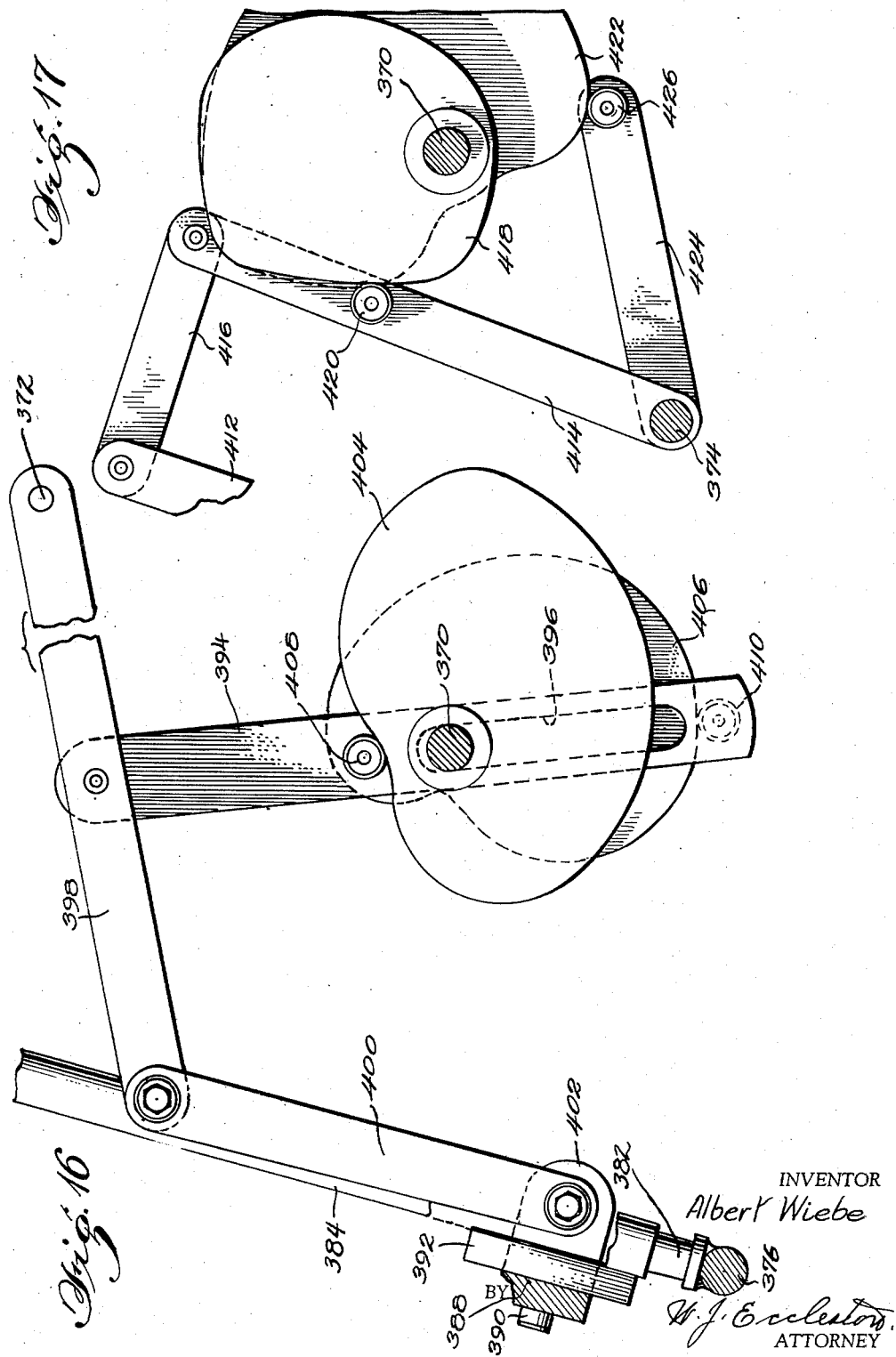

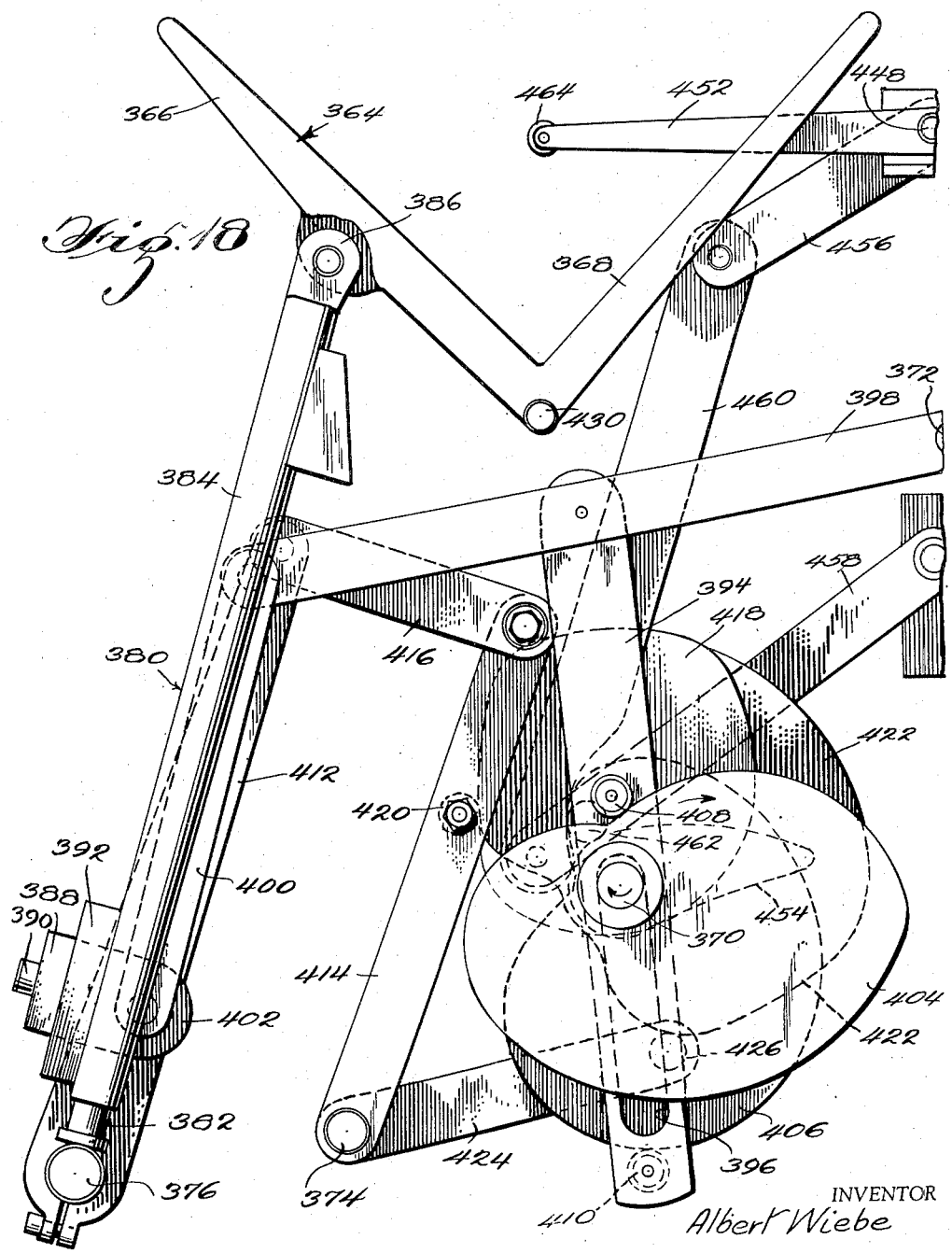

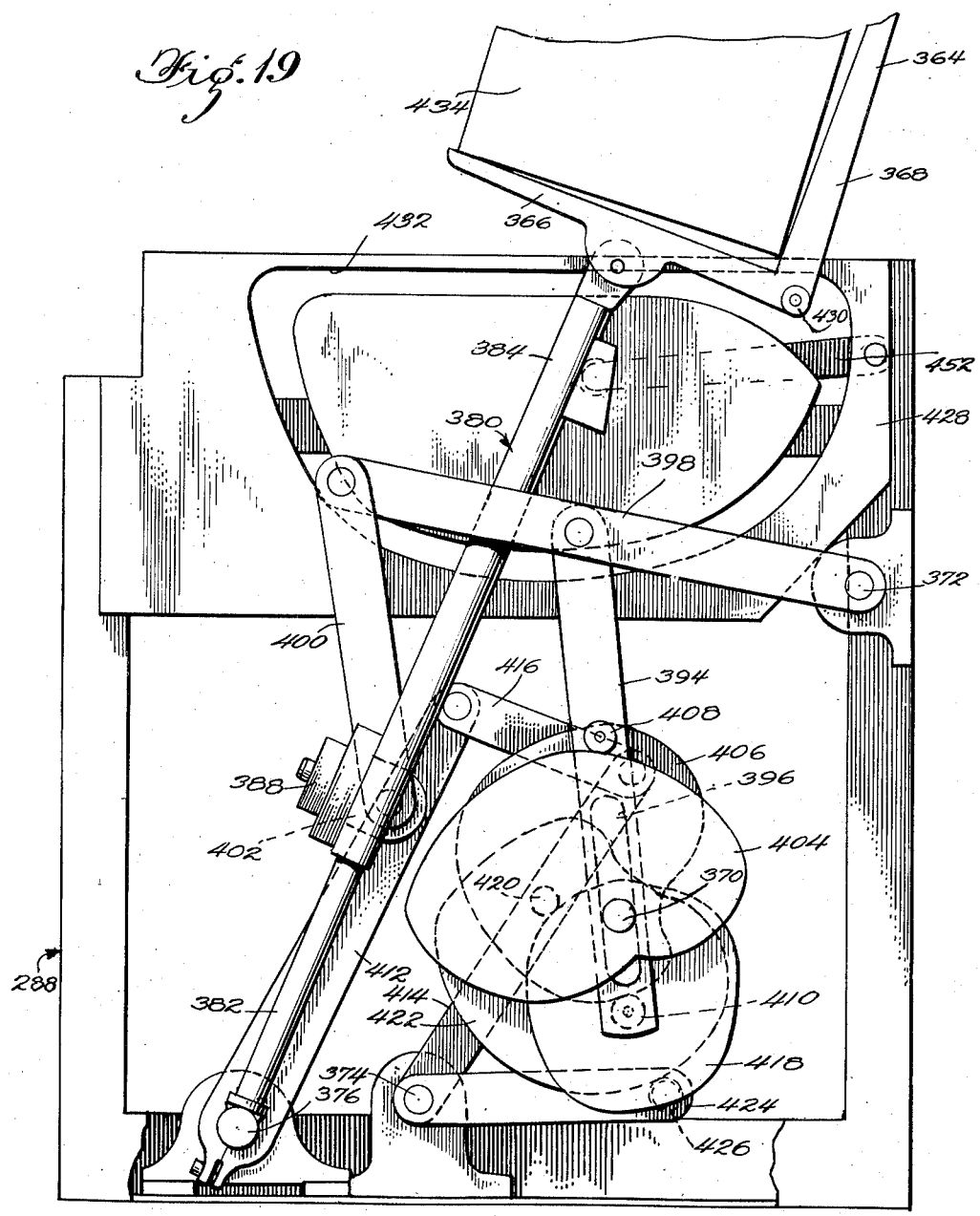

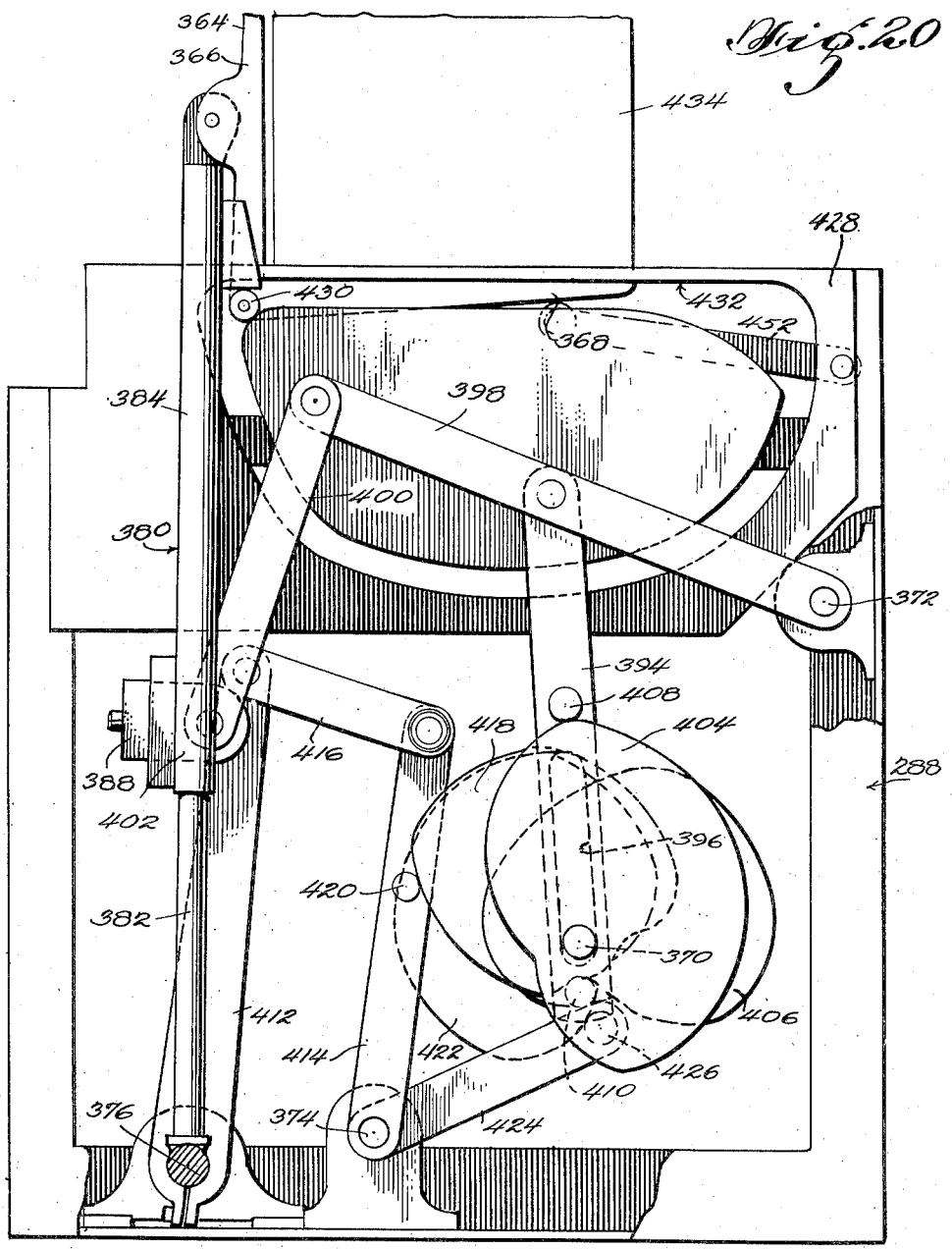

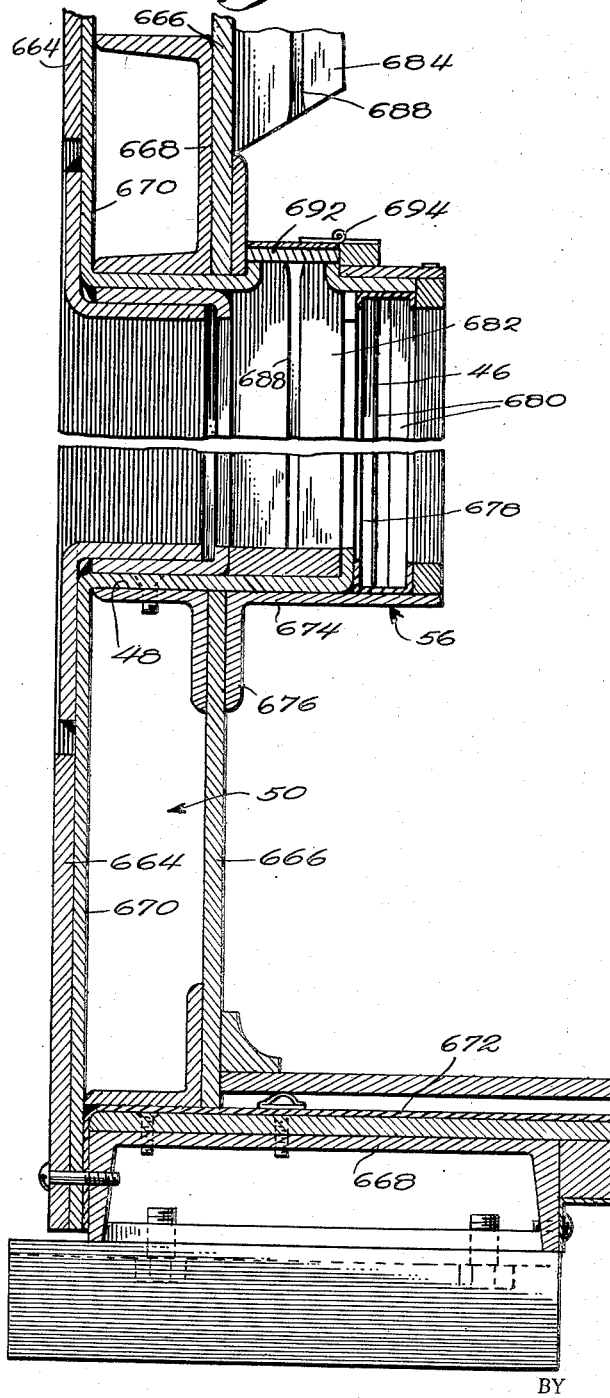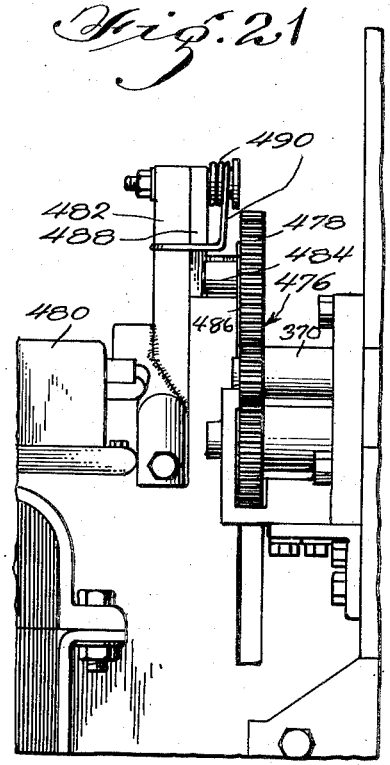

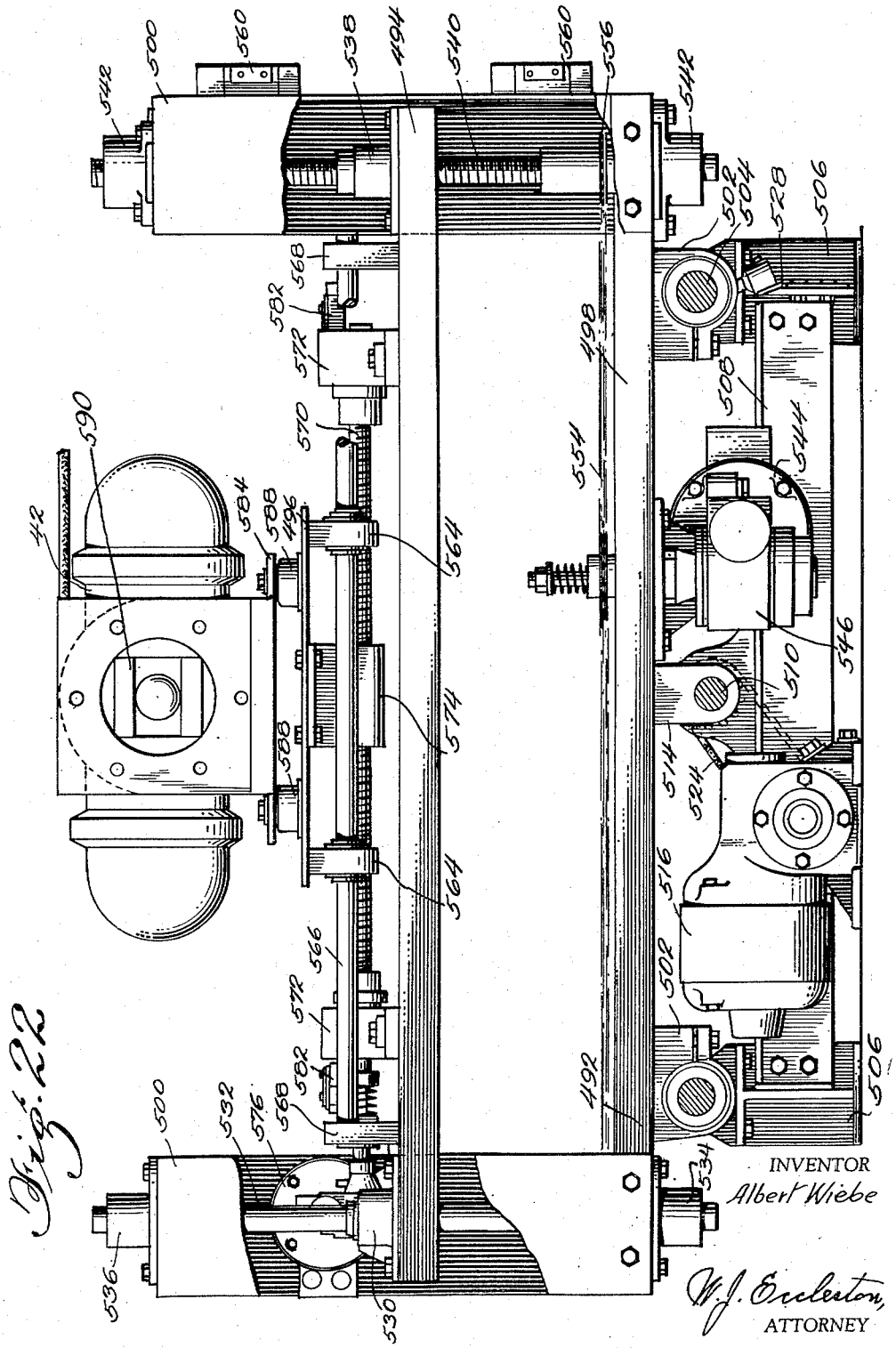

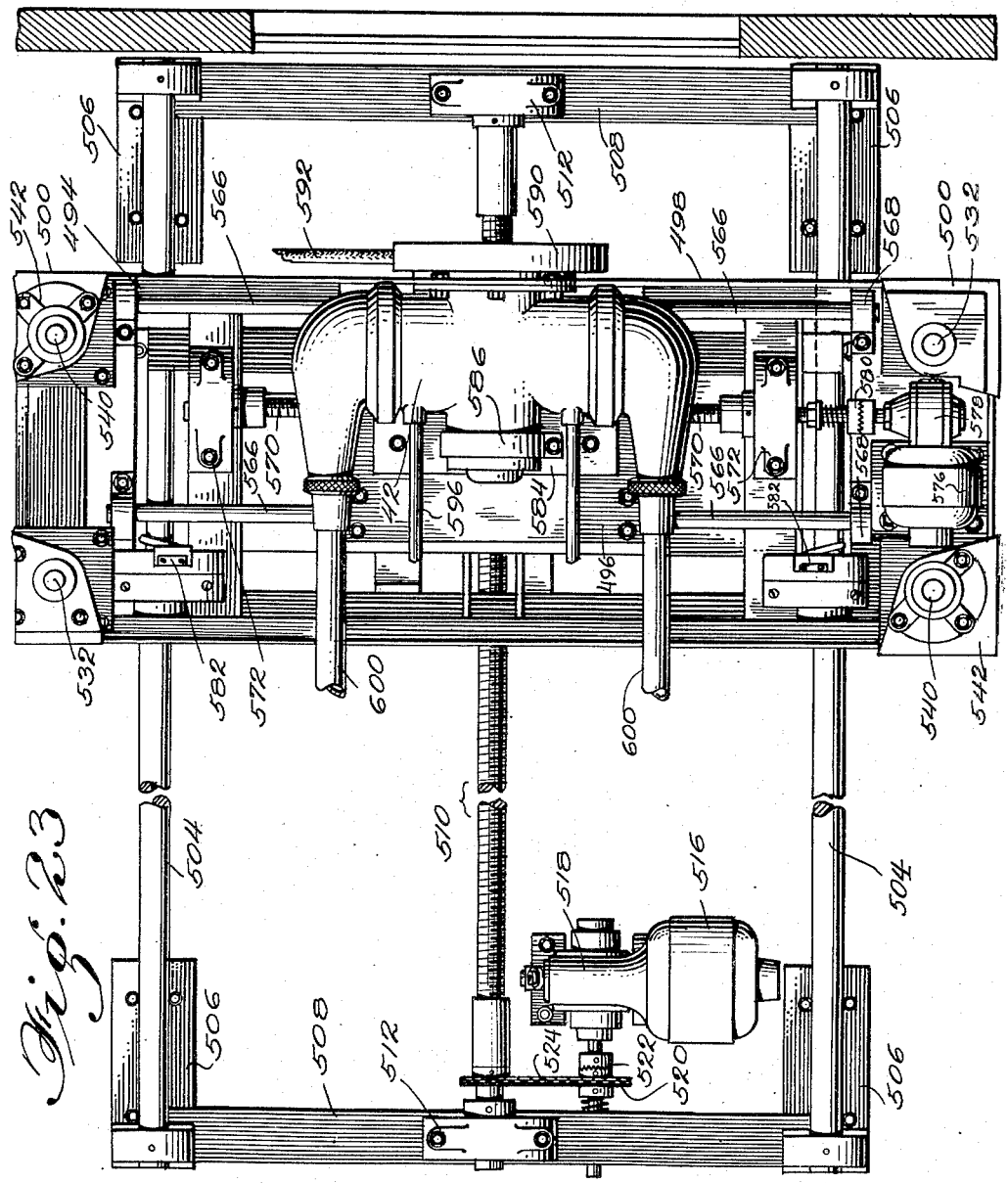

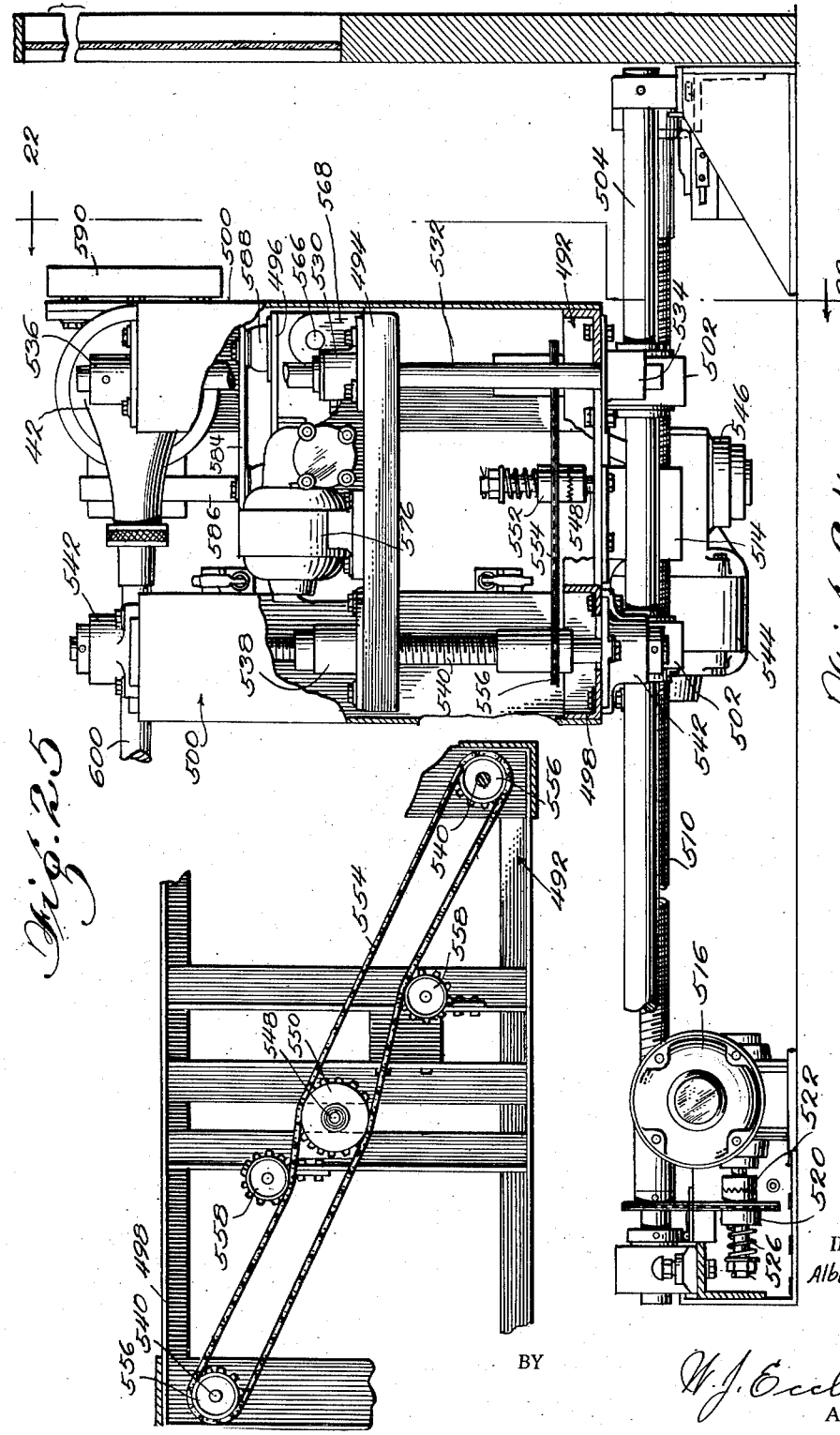

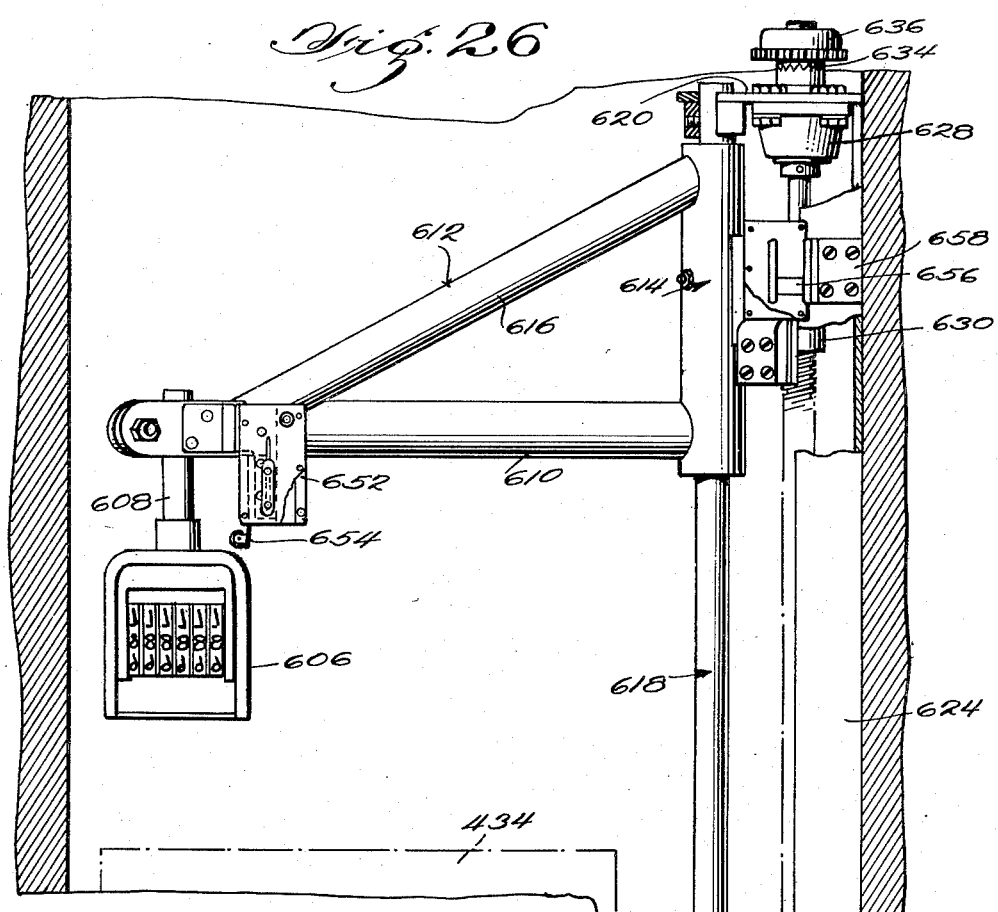

United States Patent Office 2,813,201
Patented Nov. 12, 1957

2,813,201

X-RAY INSPECTION APPARATUS

Albert Wiebe, Brooklyn, N. Y.

Application August 29, 1951, Serial No. 244,247

31 Claims. (Cl. 250—53)

(Granted under Title 35, U. S. Code (1952), sec. 266)

The invention described herein, if patented, may be manufactured and used by or for the Government for governmental purposes without the payment to me of any royalty thereon.

The present invention relates to X-ray inspection apparatus and more particularly to a self-contained mobile apparatus for examining packaged objects, such as cartons of canned or bottled goods while they are packaged.

Canned goods normally is packaged for handling in commerce or for storage in warehouses, etc., in cartons containing a plurality of cans or bottles. When stored in warehouses, etc., canned goods must be inspected at intervals to ascertain the state of preservation thereof. As heretofore carried out such inspections were relatively unreliable, expensive and time consuming. Unreliability of these prior inspections resulted for the reason, among others, that only a relatively few cartons picked at random from a stored lot could be inspected.

These examinations were laborious, expensive and time-consuming undertakings because the sample cartons had to be selected from the entire stored lot, moved to an inspection station, then opened which very likely would involve the breaking of steel bands or straps and as a final preliminary step the cans or bottles had to be removed from the cartons. All the operations thus far mentioned were merely preliminary to the actual inspection during which each can or bottle had to be handled individually and examined for rust, for deformation due to rough handling, inadequate packaging or internal pressure and for manifestations of deterioration of the contents of the cans. After the inspection was completed, it was necessary to re-pack the cans if they were found to be acceptable, and the cartons had to be re-strapped or rebound and otherwise prepared for re-warehousing.

Inspections thus performed were not entirely reliable for the reason mentioned above and because the condition of the material in the cans could be determined only from external manifestations on the cans. The results of these inspections, at best, therefore amounted to no more than a surmise. The shortcomings of the methods heretofore used are particularly objectionable in the inspection of canned subsistence items, and therefore not suitable for use by the Armed Forces and others storing canned food in huge quantities. Furthermore, these prior methods provide no clue to the rate of deterioration of such goods. Although the advantages of the use of X-rays in making inspections was known, inspection of packaged canned or bottled goods by means of X-rays was not feasible because suitable apparatus and a method for the X-ray inspection of such goods has not heretofore existed.

Accordingly, an object of the invention is to provide a new and improved method and apparatus for fluoroscopically or radiographically inspecting objects in a safe, rapid and continuous manner which is particularly suitable for use in inspecting packaged canned or bottled goods while they are packaged.

Another object of the invention is to provide a new and improved apparatus as above specified which is self-contained and mobile so that it may be moved from place to place as desired.

A further object of the invention is to provide a new and improved indexing conveyor system for an X-ray inspection apparatus for bringing objects to be inspected to an inspecting station oriented in a predetermined manner relative to the X-ray sensitive screen or the like upon which an image of the object is to be produced.

A more specific object of the invention is to provide a new and improved indexing conveyor system as above described including a control for initiating operation of the system at the will of an operator and for automatically terminating operation thereof upon completion of a cycle of operation.

Another specific object of the invention is to provide a new and improved indexing conveyor system as above specified in which the entrance and exit are conveniently located on one side of the inspection apparatus so that the apparatus may be stationed at one side of a warehouse etc. and the objects to be inspected expeditiously moved between the warehouse and inspection apparatus.

A still further object of the invention is to provide a new and improved X-ray inspection apparatus embodying mechanism for turning the object at the inspection station in the apparatus at will between fixed positions so that images of the object on angularly related planes may be produced for examination.

Yet another object of the invention is to provide a new and improved X-ray inspection apparatus embodying means for relatively moving the X-ray tube and the object at the inspecting station so that the perspective of the image produced on the fluorescent screen or radiographic plate may be changed or examination concentrated upon particular areas of the object.

A further object is to provide a new and improved self-contained apparatus for making X-ray inspections in which the X-rays are confined to a specific part of the device; and in which controls are provided to safeguard the operator and others in the vicinity of the device from accidental exposure to X-rays when the apparatus is in use.

A still further object of the invention is to provide a new and improved self-contained apparatus for making fluoroscopic or radiographic examination of objects which includes a compartment and the equipment essential for developing radiographs including a self-contained source of current and source of water along with means to maintain the water at the proper temperature for use in developing radiographs.

Another object of the invention is to provide a new and improved self-contained apparatus for making X-ray inspection of objects such as packaged canned goods which includes mechanism that may be used positively to identify objects at the inspection station so that non-acceptable objects may be removed from the lot after they are discharged from the inspection apparatus.

A more general object of the invention is to provide a new and improved apparatus for carrying out the inspection of packaged canned or bottled goods or the like by means of X-rays in which mechanism is provided for carrying out a method of inspection efficiently and almost entirely automatically which mechanism is compactly arranged so as to require a minimum of space, generally of sturdy construction so as to be relatively free of malfunctioning and which is of relatively inexpensive construction.

These and other objects, advantages and capabilities of the invention will become apparent from the following description in which reference is had to the accompanying drawings wherein:

Fig. 1 is a plan view of the interior of the trailer which forms the housing for the inspection apparatus of the present invention showing the position of the various elements in the apparatus.

Fig. 2 is a side elevational view of the apparatus shown in Fig. 1 as it appears when viewed in the direction of the arrows on the line 2—2 on that figure.

Fig. 3 is a vertical transverse view of the inlet to the indexing conveyor system in the inspection apparatus of the present invention as it appears when viewed in the direction of the arrows on the line 3—3 on Figure 1 on a slightly enlarged scale.

Fig. 4 is a fragmentary side elevational view on an enlarged scale of the automatically operating stop in the inlet conveyer system of the present invention taken on the line 4—4 of Figure 3.

Fig. 5 is a vertical sectional view on an enlarged scale taken on line 5—5 of Figure 4.

Fig. 6 is a fragmentary top plan view on an enlarged scale of the lower transfer forming part of the indexing conveyor system of the present invention.

Fig. 7 is a side elevational view on a slightly enlarged scale of a part of the indexing conveyor system in the apparatus of the present invention as it appears when viewed in the direction of the arrows on the line 7—7 of Figure 1.

Fig. 8 is a partly sectional fragmentary top plan view on an enlarged scale of the upper transfer, inspection station and discharge runway forming part of the indexing conveyor system of the present invention.

Fig. 9 is a vertical transverse view of a portion of the indexing conveyor system of the present invention as it appears when viewed in the direction of the arrows on the line 9—9 of Figure 1.

Fig. 11 is a fragmentary view showing the connection between the outer closure for the discharge outlet for the indexing conveyor system and an extension on the discharge runway for the system.

Fig. 12 is a front elevational view of the mechanism for turning an object at the inspection station of the apparatus of the present invention to and from a position angularly removed from the position at which the object is delivered to this inspection station.

Fig. 13 is a side elevational view of the left side of the unit shown in Fig. 12.

Fig. 15 is a top plan view partly broken away of the cam and lever mechanism by means of which turning of objects at the inspection station is effected dissociated from the rest of the object turning unit.

Fig. 16 is a fragmentary side elevational view on an enlarged scale of a portion of the cam and lever mechanism for effecting turning of the object at the inspection station dissociated from the rest of the unit.

Fig. 17 is a view similar to Fig. 16 of another portion of this mechanism.

Fig. 18 is a side elevational view on an enlarged scale of all of the cam and lever mechanisms for turning objects at the inspection station dissociated from the rest of the unit showing the position these mechanisms assume when the unit is at rest.

Fig. 19 is a side elevational view showing the cam and lever mechanisms of the object turning unit at an intermediate position.

Fig. 20 is a view similar to Fig. 19 and showing the cam and lever mechanisms at still another position which they assume during the course of a cycle of operation of the object turning unit.

Fig. 21 is a fragmentary side elevational view of the switch which automatically terminates operation of the object-turning mechanism when an object has been turned through a predetermined angle.

Fig. 22 is a fron elevational view on an enlarged scale taken in the direction of the arrows on the line 22—22 of Fig. 24 showing the mount for the X-ray tube in the apparatus of the present invention.

Fig. 23 is a top plan view of the tube mount on an enlarged scale.

Fig. 24 is a side elevational view, on an enlarged scale and partly in section, of the tube mount of the present invention.

Fig. 25 is a fragmentary view showing the drive for a part of the tube mount.

Fig. 26 is a side elevational view, on an enlarged scale, of a portion of the device for marking objects to be inspected as they are moved through the inspection apparatus by the indexing conveyor system.

Fig. 27 is a fragmentary top plan view of the marking apparatus shown in Fig. 26.

Fig. 28 is a transverse horizontal sectional view on an enlarged scale taken on the line 28—28 of Fig. 2.

General description

Figure 10:
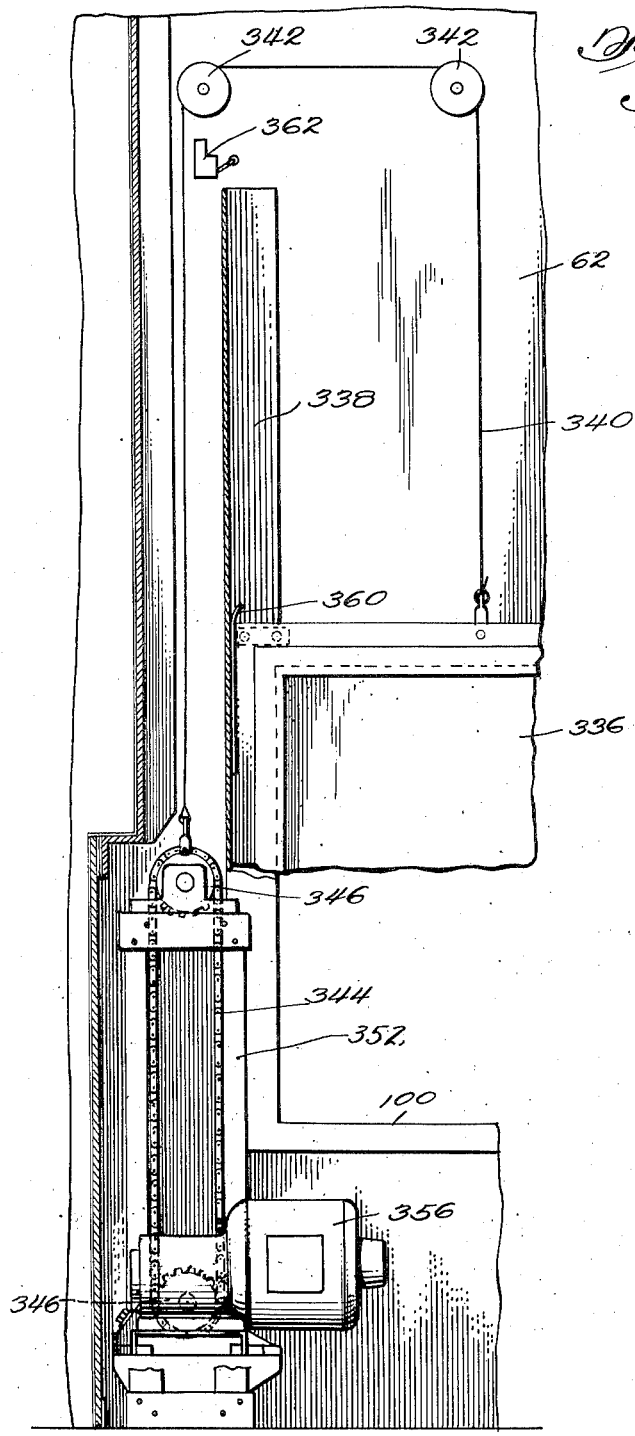
Fig. 10 is a fragmentary side elevational view on an enlarged scale of the apparatus for preventing accidental escape of X-rays from the discharge outlet for the indexing conveyor system of the present invention when the apparatus is in use.

In order to simplify understanding of the invention, the individual units in the inspection device and the operation thereof will first be briefly set forth. In the normal operation of the device, objects to be inspected such as cartons or packages of canned goods are manually fed to a gravity inlet conveyor 30 (Figs. 1 and 3). A stop 32 (Fig. 3) projectible into and out of the path of movement of the objects on this conveyor controls release of these objects to a lower transfer 34. From this transfer, the objects are delivered one at a time to an upper transfer 36 (Figs. 1 and 7) by an endless conveyor comprising duplicate conveyor chains 38 (Fig. 6). Upper transfer 36 directs the objects delivered to it to a table 40 (Figs. 8 and 9) located below the field between an X-ray tube 42 (Fig. 2) in an X-ray impervious compartment 44 and a fluorescent screen 46 (Fig. 28) located opposite an opening 48 in a common wall 50 between the X-ray tube compartment 44 and a lightproof inspection compartment 52 in which the image on the screen 46 may be viewed by an operator.

The duplicate conveyor chains 38, stop 32 and lower and upper transfers 34 and 36 respectively are driven in synchronized relation from a common source of power such as an electric motor 54 (Fig. 7) so as to cooperate in delivering objects to be inspected to the table 40 one at a time oriented in a predetermined manner relative to the screen 46. Operation of the source of power is controlled by the operator from the inspection compartment 52, and once operation commences it continues until the cooperating parts have been driven through one complete cycle whereupon a clutch between the motor 54 and the parts it drives is automatically disengaged to discontinue the drive from the motor 54 to the duplicate conveyor chains 38. During the course of a single cycle of these cooperating parts, the object on table 40 at the time of commencement of the cycle is discharged from the X-ray impervious compartment 44, another object to be inspected is delivered to the table 40 and the supply of objects on the duplicate conveyor chains 38 is replenished by the cyclic operation of the stop 32. This stop releases a single object on the inlet conveyor 30 to the lower transfer 34 during each cycle of operation of the device. The mechanism above mentioned, i. e., the inlet conveyor 30, stop 32, lower and upper transfers 34 and 36, respectively, and the duplicate conveyor chains 38 thus constitute an indexing conveyor system for moving objects step-by-step through a plurality of predetermined stages one of which is the table 40.

When the X-ray tube 42 is energized, an image of the object on the table 40 is produced on the screen 46. Energization of the X-ray tube 42 is manually controlled from the inspection compartment 52 so that the operator may view the image at leisure or may make an exposure of the same on a radiographic plate in a combined screen and cassette holder 56 (Figs. 1 and 28) in the inspection compartment in operative relation with the X-ray tube 42.

Empirically it has been found that the presence on the screen 46 of perceptible evidence of defects in the object being observed may depend on the objective plane of penetration of the X-rays. This is particularly true of packaged canned goods where there is more than one row of cans in a package. For this reason the inspection device of the present invention is provided with a tilting mechanism 58 (Figs. 2 and 9) under the table 40 for turning an object on the table to and from a fixed position angularly removed a predetermined amount from the position at which it was delivered to the table while maintaining the locus of the object in the field of the X-ray emanations substantially constant. An independent source of power, such as an electric motor 60 (Fig. 12) is provided for operating the tilting mechanism 58. This motor is provided with a control which is manually operable to initiate operation thereof and automatically operable to de-energize the motor after the object on table 40 has been turned from one fixed position to another. Thus images of the object on table 40 on two objective planes may be viewed on the screen 46 so as greatly to increase the accuracy of inspection and the variety of objects which may be inspected.

Inasmuch as the X-ray tube 42 must be relatively powerful, many safety features are incorporated in the inspection unit of the present invention to prevent accidental injury to the operator or others when the device is in use. Since the inspection device disclosed herein was designed particularly for use by the Armed Forces, it is self-contained and portable so that it may readily be moved between various depots or other places of storage of packaged canned subsistence or other items. However, it is to be understood that many of the features of the invention may be used in stationary and non-self-contained units.

Housing

Referring to Figs. 1 and 2, it will be seen that all of the operating mechanisms for the device of the present invention are housed in a trailer having right and left-hand side walls 62 and 64 respectively, front and rear end walls 66 and 68 respectively, and top and bottom walls 70 and 72 respectively. The interior of the trailer is divided into a plurality of compartments and passageways by a series of walls including the common wall 50 between the tube compartment 44 and inspection compartment 52, a transverse wall 74 between the latter compartment and a plate developing and examining compartment 76, a transverse wall 78 defining the rear end of the latter compartment and a transverse wall 80 defining an equipment compartment 82 in the rear end of the trailer and cooperating with transverse wall 78 to form the side walls of a transverse inlet passage 84 in which the gravity inlet runway or conveyor 30 is located. A longitudinally extending wall 86 (Fig. 1) forms one side-wall of the inspection and plate developing compartments 52 and 76 respectively and cooperates with the left side wall 64 of the trailer to form a longitudinal passageway 88 extending between the inlet passageway 84 and tube compartment 44. Access to the tube compartment 44 is had through a door 90 in the front end wall 66 while a door 92 in the rear end wall 68 provides access to the equipment compartment 82.

Access to the developing compartment 76 is had through a door 94 in the right side wall 62 of the trailer. A door 96 in the transverse wall 74 leads into the inspection compartment 52 from the developing compartment 76. Openings in the right side wall 62 (Figs. 2 and 3) of the trailer form an inlet 98 to the inlet conveyor passage 84 and an outlet 100 (Fig. 9) for discharging inspected objects from the tube compartment 44. Other openings suitably located in the walls of the trailer and closed by doors provide access to the interior of the trailer for the inspection or repair of the equipment housed therein. For example, there may be an opening 102 in side wall 64 (Fig. 1) through which access may be had to the upper transfer 36 and the upper end of the duplicate conveyor chains 38.

Injurious exposure of the operator in the trailer or others in the vicinity of the trailer to X-rays when the tube is energized is avoided by lining the walls defining the tube compartment 44 with sheet lead of suitable thickness. The doors for closing the openings in this compartment should be similarly lined so that the X-ray tube compartment 44 is impervious to the passage of X-rays when all of the doors therein are closed. This is also necessary to protect undeveloped radiographic plates against exposure during handling in the inspection or developing compartments 52 and 76 respectively.

Inlet conveyor

The inlet conveyor 30 (Fig. 3) comprises a plurality of rollers 104 of conventional construction rotatably mounted in any suitable manner in spaced angle iron side rails 106 supported adjacent opposite ends upon suitably located vertically extending structural members 108 and 110 forming part of the frame of the trailer or of the dividing walls therein. At its upper end the inlet conveyor 30 extends into the inlet opening 98 in the side wall 62 of the trailer while its lower end terminates at the level of the lower transfer 34 in the plane of the longitudinal partitioning wall 86.

Objects to be inspected are guided along the inlet conveyor 30 by a series of rollers 112 freely rotatable upon studs projecting upwardly from the horizontal flanges on side rails 106. Assurance that objects entering the conveyor will align properly is obtained by providing a guide roller 114 on each side of the conveyor near its upper end suitably mounted at an elevated position relative to rollers 112.

As previously explained, gravitational movement of objects on the inlet conveyor 30 is arrested by the reciprocable stop 32 which comprises a stop roller 116 (Figs. 4 and 5) rotatably mounted in a bracket 118 substantially vertically reciprocable in the space between adjacent rollers 104 approximately midway between the ends of the conveyor 30. Bracket 118 comprises a pair of end members 120 held in spaced relation by a pair of crossbars 122. The bracket 118 has a vertically extending sleeve 124 on each of its ends fixedly secured to suitable outwardly extending lugs on the end members 120 (Fig. 4). These sleeves are slidable upon generally vertically extending rods 126 (Figs. 4 and 5) fixedly secured on oppositely disposed channel shaped supports 128 rigidly secured to suitable fixed supporting structure on opposite sides of the inlet passageway 84. Supports 128 each carry a second fixed vertically extending rod 130 parallel to the first and each encircled by a coiled compression spring 132 which bears at its upper end against a horizontally extending part of the support 128 and at its lower end against a laterally extending lug 134 on end members 120 loosely engaged upon rods 126 and 130. By virtue of this construction the stop roller bracket 118 and stop roller 116 are telescopically movable on rods 126 and are biased downwardly toward retracted position.

Downward movement of the stop roller bracket and stop roller is limited by a cam roller 136 (Fig. 3) rotatably mounted adjacent the lower end of stop roller bracket 118 which is brought into engagement with cams 138 rotatably supported below the inlet conveyor 30 under the influence of the biasing force of springs 132 to limit downward movement of the stop roller bracket 118. Cams 138 are fixed upon a cam shaft 140 rotatably supported in suitable bearings 142 (Fig. 4) mounted on a stand fixed to the floor 72 of the trailer. The stand comprises a plurality of vertically extending legs 143 supporting a bed 144 consisting of longitudinally extending angle iron members interconnected by a plurality of crosspieces.

Cams 138 are of generally circular contour (Fig. 3) and the circular portion of these cams is of sufficient diameter to maintain the stop roller bracket 118 and stop roller 116 in elevated position while the cam roller 136 is engaged therewith. However, the cams 138 have a relatively short recess 146 in their periphery, and when this recessed portion of the cams is brought opposite cam roller 136 the stop roller bracket 118 is forced downwardly a sufficient distance by the springs 132 to bring the upper side of stop roller 116 into the plane of rolling contact of rollers 104 in inlet conveyor 30. As a result, objects on the uphill side of stop roller 116 are released and gravitate toward the lower end of the inlet conveyor 30. Since the recess 146 is short in length, stop roller 116 is raised to elevated position almost immediately following its depression.

The drive for camshaft 140 includes a transverse rotatably driven shaft 148 (Fig. 3) which has a bevel pinion 150 fixed on one of its ends. This end of the shaft is rotatably supported in a bearing 152 mounted on the bed 144 of the cam shaft supporting stand. Bevel pinion 150 meshes with a bevel gear 154 (Fig. 4) fixed on the rearwardly facing end of cam shaft 140. Transverse drive shaft 148 is driven by mechanism which will be described in detail subsequently in a direction to cause the cam shaft 140 to be rotated clockwise as seen in Fig. 3.

By virtue of the contour of cam 138 the stop roller 116 will be depressed only once during each revolution of the camshaft 140. Furthermore, depression of the stop roller 116 occurs abruptly while it is raised relatively gradually. Normally, the stop roller will remain depressed for an interval only long enough for one object to pass. As a matter of fact when cartons or packages of canned goods of normal size are being examined the stop roller will start to rise before the carton has completely passed it so that assurance is had that cartons on the conveyor 30 on the uphill side of the stop roller will be released one at a time. Since the stop roller 116 will be returned to operative position before a released carton has completely passed it, the rear end of this carton will be tilted upwardly. To prevent its forward end from jamming between adjacent rollers 104, cross bars 156 are provided between adjacent pairs of rollers 104 on the immediate downhill side of the stop roller 116.

As best seen in Fig. 3, a novel extension 158 for the upper end of the inlet conveyor 30 is provided which may be swung to a collapsed or inoperative position in the inlet opening 98 as shown in phantom in that view. This extension conveyor 158 comprises a plurality of rollers 160 of conventional construction rotatably mounted by conventional means in a pair of angle iron side rails, one of which is shown at 162 in Fig. 3. These side rails are held in spaced relation by a plurality of cross pieces 164 to provide a rigid frame. At their lower ends the side rails 162 are rockably secured upon extensions on shafts or studs 166 by means of which the upper roller in the inlet conveyor 30 is rotatably supported in the inlet opening 98.

Downward swinging movement of the extension conveyor 158 is limited by a generally rectangular knee brace 168. This brace is hinged to the side rails 162 so that it may be swung from the diagonal operative position shown in full lines in Fig. 3 to the inoperative position shown in phantom in that view at which position the knee brace rests along the back side of the extension conveyor 158. In its operative position the lower end of the knee brace 168 rests upon a fixed stop 170 on the outer side of wall 62 of the trailer, and, as a result, the frame of the auxiliary inlet conveyor 158 is supported in a plane inclined to correspond with the inclination of the plane of inlet conveyor 30 so that the upper side of the rollers 104 in the inlet conveyor 30 and the upper side of the rollers 160 in auxiliary extension conveyor 158 lie in the same plane of rolling contact.

Upward swinging movement of the extension conveyor 158 is limited by stop 172 and the extension conveyor may be releasably locked in raised position by a latch 174. A door 176 hinged to the side wall 62 of the trailer upon a vertical axis is provided to close the inlet opening 98 when the device is not in use and this door may be provided with suitable latches for releasably locking the same in closed position. Preferably a limit bar 178 is provided across the inlet opening 98 to prevent objects over the maximum height fixed by this bar from passing through opening 98 onto inlet conveyor 30.

Lower transfer and elevating conveyor

The lower transfer 34 to which objects are delivered from the inlet conveyor 30 comprises a plurality of conveyor rollers 180 (Figs. 6 and 7) rotatably mounted in parallel relation to the inlet conveyor rollers 104 in suitable rigid transverse horizontally extending frame members 182 fixedly mounted in the trailer. Objects to be inspected are moved from this lower transfer to the upper transfer 36 by the duplicate elevating conveyor chains 38 (Fig. 7) which have a plurality of flights 184 secured thereto in equally spaced relation. Chains 38 pass over a pair of sprockets 186 on the transverse shaft 148 previously mentioned, a second pair of sprockets 188 on a freely rotatable shaft 190 horizontally aligned with the shaft 148 and a third pair of sprockets 192 adjacent the upper transfer 36 so that the upper reaches of the conveyor chains 38 at this point are substantially in the horizontal plane of the upper transfer 36.

In addition to being supported in bearing 152 (Fig. 3) as previously mentioned, transverse shaft 148 is also rotatably mounted in bearings 194 supported on suitable fixed structure in the trailer anchored on opposite sides of the longitudinal passageway 88. Shaft 190 is freely rotatable in suitable bearings (not shown) slidable in oppositely disposed slideways. One of these slideways is shown at 196 (Fig. 7). This shaft therefore may be moved in a fore and aft direction by means of adjusting screws, one of which is shown at 198 to provide for adjustment of the tension in the chains 38. The third pair of sprockets 192 is mounted on a shaft 200 rotatably supported in suitable bearings (not shown) suitably fixed on opposite sides of longitudinal passageway 88 adjacent the upper transfer 36.

The lower reaches of the chains 38 are supported by suitable guides while the upper reaches of these chains pass between adjacent rollers 180 (Fig. 6) near the opposite edges of lower transfer 34 and are held in depressed position along this transfer by a chain guide 202 fixed in the passageway 88 forward of the lower transfer. This guide has lateral flanges 204 (Fig. 7) forming a bottom guide for the upper reaches of the chains 38 and a plate 206 of a width corresponding substantially to the distance between the outer sides of the chains 38 so that the lateral edges of this plate engage the top side of the upper reaches of the chains 38 and hold them against bottom guides 204 in a plane below the plane of rolling contact of the rollers 180 in the lower transfer 34. Thus, objects to be inspected may pass onto the lower transfer 34 without interference from the chains 38.

From the lower guide 202 to the upper pair of sprockets 192, the upper reaches of chains 38 are guided and supported by the walls of a pair of grooves 208 formed in a sheet metal bottom plate 210 on the underside of the upper reaches of chains 38. Moisture or other foreign material collecting on this inclined bottom plate tends to gravitate towards the chain guide 202 which has an arcuate bottom wall 212 for receiving such foreign material. A drain pipe 214 projecting through the floor 72 provides egress for the foreign material which drains into the chain guide. The flights 184 which are carried by chains 38 may comprise angle irons secured to raised seats 216 on the lateral edges of chains 38 so that they are free to pass the lower transfer 34 and guide 202 without interference. Objects transported from the lower to the upper transfer are guided by the left side wall 64 of the trailer and a pair of guide rails 218 extending from the lower to the upper transfer and secured in fixed position by suitable fixed supporting structure in the trailer.

Power for driving the duplicate conveyor chains 38 is supplied by the electric motor 54 through a speed reducer 220 (Fig. 7) an electro-magnetic combined clutch and brake 222 being provided to control the application of power from the motor shaft to the speed reducer 220. These parts are supported below the bottom plate 210 upon a stand fixed to the floor of the trailer comprising a suitable bed supported by legs 224. Conveyor chains 38 are driven from the output shaft of the speed reducer 220 by a sprocket chain 226 passing over a sprocket on that shaft and a sprocket fixed on upper sprocket shaft 200. By virtue of this drive the conveyor chains 38 have a relatively low linear velocity in a direction to move the upper flights thereof from the lower transfer 34 toward the upper transfer 36.

As a safety precaution a switch 228 is provided at the inner junction of the inlet conveyor 30 and the lower transfer 34 for de-energizing the circuit of the magnetic clutch 222 and thus discontinuing the drive to the conveyor chains 38 should a carton or other object to be inspected for any reason fail to align properly with conveyor chains 38 and thus jam against the inner junction when operation of these chains commences.

*Upper transfer*

The upper transfer 36 (Figs. 7 to 9) to which objects to be inspected are delivered by the duplicate conveyor chains 38 comprises a supporting framework which need not be described in detail since it may take various forms. The portion of the framework shown in Fig. 9 includes vertically extending legs 230, structural members 232 extending from front to rear of the framework assuming the side of this transfer adjacent the conveyor chains 38 is the front side and transverse angle irons 234 supporting the structural members 232.

Rotatably supported at their opposite ends in the frame members 232 is a plurality of rollers 236 (Fig. 8) extending transversely of the direction of travel of objects on the duplicate conveyor chains 38 so as freely to receive objects therefrom. The upper reach of a pair of spaced sprocket chains 238 pass between spaced pairs of rollers 236 and over similar sprockets 240 (Fig. 9) fixed upon left and righthand sprocket shafts 242 and 244 respectively at such an elevation that the upper reaches of the chains 238 lie below the plane of rolling contact of the rollers 236. The righthand sprocket shaft 244 is rotatably supported in suitable bearings, one of which is shown at 246 (Fig. 9) mounted on one of the horizontal frame members 234. Similar bearings (not shown) similarly supported may be provided for the left sprocket shaft 242. The transfer sprocket chains 238 also passes over idler sprockets one of which is shown at 248 (Fig. 9) rotatably supported on the underside of the rollers 236 in bearings depending from horizontal frame members 234. One of these bearings is shown at 250 in Fig. 9.

Transfer sprocket chains 236 drive a single flight 252 which is secured to suitable raised seats on the transfer chains 238 so that this flight readily clears the rollers 236 in the upper transfer 36 and is in a position to engage an object on this transfer when it travels along the upper side of the transfer. The transfer chains 238 are driven in timed relation to the duplicate conveyor chains 38 from the output shaft of speed reducer 220 by drive means including a sprocket chain 254 (Fig. 7) driven from a sprocket on this output shaft which chain is in driving engagement with a sprocket 256 on a shaft 258 below and extending from left to right of the upper transfer 36 as seen in Fig. 9. Shaft 258 is rotatably supported in suitable bearings, one of which is shown at 260 in Fig. 9 mounted on a pedestal fixed to the floor of the trailer. The other end of shaft 258 rotates in a similar bearing similarly mounted. A bevel gear on this shaft meshes with a similar bevel gear fixed on a shaft 262 (Fig. 7) extending from front to rear of the upper transfer 36 and rotatably mounted in bearings 264 secured to the upper end of suitable pedestals fixed to the floor of the trailer.

Keyed to this shaft 262 is a sprocket 266 (Fig. 9) which drives a chain 268 engaged over a sprocket keyed to the left hand sprocket shaft 242 thus to provide a positive drive for the latter shaft and the upper transfer chains 238 which are driven by the sprockets 240 fixed on the shaft 242. Preferably an idler 270 is provided for maintaining the drive chain 268 taut. Also supported below the upper transfer rollers 236 is a short shaft 272 (Fig. 8) rotatable in suitable depending brackets on the transfer frame, one of which is shown at 274 (Fig. 9). A relatively large gear 276 keyed to the short shaft 272 is driven by a relatively small pinion 278 on a shaft 280 at a relatively low rate of speed. The idlers 248 for the transfer chains 238 are keyed to the shaft 280 so that the latter is driven whenever the transfer chains are driven. Keyed to the short shaft 272 is a trip finger 282 which, due to the ratio of the gear 276 and pinion 278 is rotated at a relatively slow rate. At a predetermined point in the cycle of the short shaft 272 the finger 282 trips the movable contact on a switch 284. This opens the circuit for the electromagnetic clutch 222 and thus automatically terminates a cycle of operation of the indexing conveyor system.

Forward of the transfer rollers 236 in the direction of movement of the upper reach of transfer conveyor chains 238 the transfer is provided with a flat slotted top plate 286 against which the right hand edge of table 40 abuts as seen in Fig. 8. At one stage in the course of the step-by-step movement imparted to the objects to be inspected by the indexing conveyor system, the objects come to rest centered on the table 40 now to be described. This table forms the inspection station for the device.

*Table*

The table 40 which is centered relative to the opening 48 in the common wall 50 between the tube and inspection compartments 44 and 52 respectively comprises a frame 288 having vertically extending legs 290 (Figs. 9 and 13) and a plurality of longitudinally and transversely extending members joined to the legs to form a rigid generally rectangular frame. Adjacent its top edge, front and rear frame members 292 and 294 respectively (Fig. 13) are provided, the side of the framework adjacent the common wall 50 being assumed to be the front side for the purposes of this description. These top frame members rotatably support a plurality of rollers 296 on axes extending from front to rear, the opposite ends of these rollers being aligned substantially with the opposite end rollers in the upper transfer 36 (Fig. 8).

The table rollers 296 are provided with shafts 298 which project through rear frame member 294 on the rear side of the table, and they are arranged in groups spaced from each other to form four spaces 300 for a purpose to be described. Drive pinions 302 (Fig. 9) are fixed upon the projecting ends of the roller shafts 298 and a sprocket chain 304 (Figs. 8 and 9) is engaged over these drive pinions. This chain also passes over a sprocket fixed on the left hand sprocket shaft 242 in the upper transfer 36 so that the rollers 296 in table 40 are positively driven in a direction to carry an object forward, i. e., from right to left (Fig. 9), when the indexing conveyor system is operated through a cycle. Suitably located idlers 306 are provided to hold the chain 304 in driving engagement with drive pinions 302 and a protective cover and top plate 308 (Figs. 8 and 13) is fixed to the rear of the frame of the table over this drive system for the rollers 296. The object tilting mechanism 58 is mounted below the rollers 296 in the supporting frame for the table 40. This tilting mechanism is separately powered and controlled independently of the indexing conveyor system so that it may or may not be used in the process of inspecting an object although ordinarily it will be used particularly when packaged canned goods are being inspected. The construction and operation of this tilting mechanism will be described in detail hereinafter.

*Object-discharging means*

Aligned with the upper transfer 36 and the table 40 in the direction of travel of objects to be inspected is a gravity discharge conveyor or runway 310 (Figs. 1 and 9) comprising duplicate side rails 312 (Fig. 8) disposed in fixed spaced relation by suitable cross pieces. The frame thus formed supports a plurality of freely rotatable rollers 314. Its upper end is supported at the level of the top of table 40 by a standard anchored to the floor of the tube compartment 44 and fragmentarily shown at 316 (Fig. 9), while its lower end is supported adjacent the lower end of the discharge opening 100 by a bracket 318 fixed to the side wall 62 of the trailer. The side rails 312 are aligned in an end-to-end direction with the top frame members 292 and 294 in the table 40 and guide rails 320 are provided to guide objects along the conveyor to the discharge opening 100.

Rockably secured in this opening is an extension conveyor 322 comprising a rigid frame including duplicate side rails one of which is shown at 324 in Fig. 9 interconnected by suitable crosspieces. This frame supports a plurality of freely rotatable rollers 326. Adjacent one of its ends it is hinged to the opposite side of the discharge opening 100 adjacent the lower end of the latter so that this extension conveyor may be swung between the inoperative position shown in full lines in Fig. 9 at which it rests in the discharge outlet 100 and the operative position shown in phantom in that view. At the latter position it is inclined downwardly so that the contact surfaces of the rollers 326 lie in a plane forming a continuation of the plane of the contact surfaces of rollers 314 in gravity discharge conveyor 310.

Hinged to the underside of the extension conveyor frame by a transverse piano hinge 328 is a novel combined closure for discharge outlet 100 and knee brace for the extension conveyor 322 comprising a plywood or other suitable panel 330 slightly larger in height and width than the discharge outlet 100. To allow for relative rocking movement of the leaves of the hinge 328 the free ends of the side rails 324 are beveled as indicated in Fig. 11. An abutment or stop 332 is provided on the side wall 62 of the trailer below opening 100 upon which the free end of panel 330 may be engaged to limit downward swinging movement of the extension conveyor 322 and rigidly to support the latter in operative position. In order to make a weatherproof seal between the panel 330 and side wall 62 of the trailer, a resilient gasket 334 is provided along the inner peripheral edges of the panel.

To avoid accidental escape of X-rays through the discharge outlet 100 which it will be noted is in a portion of the side wall 62 forming part of the tube compartment 44 (Fig. 1), a lead coated panel or closure-shield 336 (Fig. 10) is provided on the inner side of this outlet. This shield is vertically reciprocable between a pair of tracks 338 in or on the inner side of wall 62 in the tube compartment 44 by mechanism including a cable 340 connected at one end to the top edge of shield 336. Cable 340 is trained over freely rotatable sheaves 342 spaced upwardly from the top edge of outlet opening 100 a distance greater than the distance the shield 336 must rise fully to uncover discharge opening 100. At its other end, cable 340 is anchored by a suitable pivot connection to the edge of a roller chain 344 engaged over sprockets or pulleys 346 spaced from each other a distance great enough so that any point on the belt in making a complete circuit around these pulleys travels vertically a distance equal to the vertical travel of the shield 336 in moving between lowered and raised positions. Thus, by properly locating the point at which the cable 340 is secured to chain 344, the latter can be rendered effective to exert a pull on cable 340 through a sufficient distance to raise shield 336 far enough fully to uncover discharge outlet 100 during the course of its circuit of pulleys 346.

These pulleys are mounted on opposed stub shafts 348 which are supported in similar bearings 350 mounted in pairs and suitably anchored upon a standard 352 at points spaced from each other the distance required to obtain linear travel of the belt 344 over a distance equal to the upward travel of the shield 336 for the purpose described. Lower shaft 348 is driven through a speed reducer 354 by an electric motor 356 of suitable size, for example, $\frac{1}{12}$ H. P. A jaw clutch 358 is provided between speed reducer output shaft and the lower pulley shaft 348. In the presence of resistance exceeding a predetermined torque the driving and driven elements of this clutch tend to slip due to the fact that the interengaging teeth on the clutch elements are of complementary triangular shape and to the fact that these teeth are held in driving engagement solely by a yieldable compression spring. For this reason, the clutch 358 will slip if the shield 336 accidentally jams while it is being raised. Damage to the motor 356 is thus avoided and the chatter of the slipping clutch elements audibly warns the operator that something is amiss.

Energization of the circuit for the motor 356 and the circuit for electro-magnetic clutch 222 is conjointly controlled so that the motor 356 is energized to move the shield 336 from its normally lowered position whenever the electro-magnetic clutch 222 is moved to engaged position.

Referring to Fig. 10, it will be noted that on one of its upper corners the shield 336 has a curved finger 360. This finger trips the movable contact of a limit switch 362 as the shield reaches open position, de-energizing the circuit for motor 356 so that operation of this motor is discontinued and the shield is held in raised position. After an interval sufficient to assure that the object to be discharged has passed discharge outlet 100 a relay in the circuit of motor 356 operates to close the motor circuit and the motor then operates for an interval sufficient fully to lower shield 336 whereupon another relay in the motor energizing circuit opens so that the shield remains in lowered position.

*Tilting mechanism*

As previously explained, the framework 288 for the table 40 supports the tilting mechanism 58 for turning objects to be inspected through an angle of 90° at will so that the object may be inspected along more than one plane. This mechanism which is covered by United States Letters Patent No. 2,710,103 comprises four tilting forks 364 (Figs. 14 and 18) aligned with the four spaces 300 (Fig. 8) between the grouped rollers 296 in the table 40 and normally disposed wholly below the plane of the top of the table. These forks which have substantially right angularly disposed arms 366 and 368 are operated in unison to tilt an object on the table 40 by operating mechanism including a rotatable main drive shaft 370 and forward, intermediate and rear rock shafts 372, 374, and 376 respectively rockable upon fixed axes. These shafts are mounted in suitable bearings carried on the framework 288 below the table top and they extend from side to side of the frame in a direction parallel to the front and rear sides thereof. One of the bearings for the rear rockshaft 376 is shown at 378 in Fig. 13.

Each of the forks 364 is connected to the rear rock shaft 376 by an extensible operating rod 380 (Fig. 18) comprising a telescopically interrelated guide arm 382 and tube 384. The four guide arms 382 are fixed at one end to the rear rock shaft 376 by welding or the like spaced from each other to conform with the spacing of the forks 364 and extending outwardly from the rear rockshaft 376 in a common radial plane. The tubes 384 which are telescopically received over these arms 382 have a lug 386 on their upper ends adapted to be pivotally connected between bifurcations on the back side of the rear arms 366 on forks 364.

Adjacent their lower ends, these tubes are interconnected by a cross bar 388 (Figs. 15 and 18) secured by cap screws 390 to raised seats 392 welded to the tubes 384. By virtue of the construction described above, the operating rods 380 may be rocked in unison by rocking the rear rockshaft 376 and may be telescopically extended or contracted in unison by forces applied to the cross bar 388 tending to raise or lower the same. This movement of the operating rods 380 transmits vertically and horizontally directed forces to the forks 364 which forces cooperate to move the forks in a manner to effect a 90° rotation of the object on table 40 as described hereinafter.

In order to impart vertically directed forces to the forks 364 the tubular portions 384 of the operating rods 380 are reciprocated in an endwise direction by two cam and lever mechanisms one of which is shown in Fig. 16 dissociated from the rest of the tilting mechanism and both of which are actuated from the main drive shaft 370. These cam and lever mechanisms are located adjacent opposite sides of frame 288 and since they are of duplicate construction only one need be described. This mechanism comprises an arm 394 having an elongated slot 396 in one portion thereof engaged over the main drive shaft 370 so that the arm is movable in an endwise direction on the driveshaft. At its upper end the arm 394 is rockably secured to the intermediate part of a lever 398 fixed adjacent its front end upon the front rockshaft 372 (Fig. 18) and connected at its rear end by a pair of links 400 to a lug 402 (Fig. 15) anchored to the crossbar 388 connecting the lower ends of the tubes 384.

Slotted arm 394 is reciprocated vertically by cooperating oppositely acting cams 404 and 406 fixed upon the main drive shaft 370. Cam 404 engages a follower roll 408 pivotally secured upon the arm 394 on the topside of the slot 396 to impart upward movement to this arm while cam 406 engages a follower roll 410 pivotally secured to the arm 394 on the portion thereof below the slot 396 to impart downward movement to the arm 394. Thus, when the main drive shaft 370 is rotated, the arm 394 is reciprocated vertically causing the lever 398 to rock upon the axis of the front rockshaft 372 so that the links 400 are reciprocated and thus cause the tubular portion 384 of the operating rods 380 to telescope on the arms 382. This imparts a vertical component of movement to the forks 364.

Horizontally directed components are imparted to the forks 364 by virtue of the cooperative action of cam and lever or linkage mechanisms shown in Fig. 17 including duplicate mechanisms for effecting movement of the forks in one direction and a single mechanism cooperating therewith to effect movement of the forks in the opposite direction. Only one of the duplicate mechanisms will be described in detail. This mechanism includes a quadrilateral lever system comprising two links 412 and 414 (Figs. 17 and 18) fixed at their lower ends respectively upon rear rockshaft 376 and intermediate rockshaft 374. At their upper ends these links are interconnected by a third link 416 pivotally connected at its opposite ends to the upper ends of links 412 and 414. Rearward rocking movement is imparted at certain intervals to this system of links and through the latter to the rear rockshaft 376 by a cam 418 fixed on the main drive shaft 370 and engaging a follower 420 pivotally secured upon link 414.

Forward rocking movement is imparted to the intermediate rockshaft 374 and through the quadrilateral linkage just described to the rear rockshaft 376 by the second mechanism which comprises a cam 422 fixed on the main drive shaft 370 and a lever 424 fixed at one end on the intermediate rock shaft 374 and having a follower 426 on its opposite end for engaging the periphery of cam 422. The two cam and linkage systems just described operate in opposition so that the rear rockshaft 376 is positively rocked both in a forward and in a rearward direction. As a result of the rocking movement of the rear rockshaft 376 horizontally directed components of force are imparted to the forks 364 through the operating rods 380.

To control the course of movement of the forks 364 resulting from the vertically and horizontally directed forces imparted thereto by the mechanism just described, a face cam 428 (Fig. 13) is provided for each fork. These cams are of duplicate construction and are fixed to a stationary part of frame 288 in closely spaced relation to the forks 364 (Fig. 12). The latter each have a follower 430 adjacent the junction of their two arms. These followers engage in continuous generally oval shaped slots 432 one of which is formed in each cam 428. When the main driven shaft 370 is turned through one revolution, the vertical and horizontal components of force which are imparted to the forks 364 through the operating rods 380 are resolved by the cooperative action of the cam followers 430 in cam slots 432, the forks being moved through a cycle during which the followers 430 make a complete circuit of the cam slots 432. During the course of this cycle, the forks 364 are tilted and elevated in such a manner that a carton 434 (Figs. 19 and 20) or other object on the table 40 is raised from the same, turned clockwise or counterclockwise as seen in Fig. 19 (depending on the direction the tilting mechanism is operating) on an axis parallel to the front of the table through an angle of 90° and then redeposited in turned position on the table at substantially the position it occupied before being turned. Roller discs 436 (Figs. 8 and 12) in the front frame member 292 reduce friction between the front arm 368 of the forks 364 and the framework of the table when the forks are tilted.

Normally, examination of objects in two objective planes at 90° angles is sufficient to make observable all of the defects therein, and it is contemplated that the tilting mechanism in the device of the present invention shall be so operated. Upon completion of this examination, it usually is desirable to return the object to its original position so that it again rests upon the side upon which it originally rests. When the object is shifted through no more than 90° during the course of its examination, its return is most easily accomplished by reverse movement of the same. To effect this return movement, the direction of rotation of the main drive shaft 370 is reversed and a jogging mechanism now to be described is provided in the tilting mechanism. This jogging mechanism is driven from cam 438 (Figs. 12 and 14) fixed on the main drive shaft 370 and having a peripheral slot 440 with an axial offset approximately 70° in end-to-end length. A lever 442 (Figs. 12 and 14) rockably secured at 444 upon the frame 288 has a follower 446 on its lower end which rides in the slot 440 and thus effects rocking movement of the lever 442 in a plane parallel to the front edge of the frame 288.

At its upper end this lever is loosely connected to a pivotally rockable and longitudinally reciprocable shaft 448 by a suitable connection 450 adapted to effect endwise movement of the shaft 448 when the lever 442 is rocked. This movement of the shaft 448 moves four horizontally extending arms 452 fixed on the shaft 448 between an inoperative position on the side of the forks 364 opposite the face cams 428 and an operative position at which the arms 452 are in the planes of the forks 364. Once during each revolution of the main drive shaft 370, the arms 452 are moved into the plane of the forks 364 and are rocked counterclockwise while in that position by mechanism to be described so as to jog the forks upwardly a slight distance. Although the forks are jogged on both forward and return movement thereof, its effect otherwise alters the course of movement of the forks only on their return and for a purpose to be described.

Pivotal rocking movement is imparted to the shaft 448 by a quadrilateral linkage actuated periodically by a trip finger 454 (Figs. 12 and 18) fixed on the main drive shaft 370. The quadrilateral linkage comprises a first link 456 (Figs. 12 and 18) fixed at one end upon the shaft 448, a second link 458 rockably secured at one end by suitable means to the front side of the frame 288 and a third link 460 pivotally secured at its opposite ends to the free ends of the first and second links. A roller 462 on the link 458 is engaged by the trip finger 454 to rock the linkage consisting of links 456, 458, and 460 upwardly. This occurs at the point in the revolution of the main drive shaft 370 at which the arms 452 have been moved into the plane of the forks 364 by endwise movement of the shaft 448 effected through the cooperative action of cam 438 and lever 442. As a result, the arms 452 are rocked upwardly for a purpose which will be described subsequently. Preferably rollers 464 (Fig. 18) are pivotally secured to the free ends of arms 452 so that contact with the forks 364 is made by these rollers.

The main drive shaft 370 from which all of the tilting mechanisms are driven is driven by the reversible electric motor 60 (Fig. 12) mounted in the front end of frame 288. This motor drives a speed reducer 466 which has an output shaft 468 that drives a sprocket 470 through a load limit jaw clutch 472 similar to the clutch 358 previously described in connection with the shield operating drive motor 356. This clutch has driving and driven elements which are adapted to slip relative to each other should the torque required to drive the tilting mechanism exceed a predetermined value.

Through a chain drive 474 and intermediate gearing 476 (Fig. 12) a gear 478 keyed to the main drive shaft 370 is driven from the driving element of clutch 472. Since the tilting mechanisms 58 are designed to operate through a complete cycle in one direction and consequently to operate the forks 364 through a course which effects a 90° rotation of a carton 434 on the table 40 during a single revolution of the cams on main drive shaft 370 a limit switch 480 (Figs. 13 and 21) is provided to open the circuit to motor 60 each time the drive shaft 370 completes a revolution in either direction. This switch also operates to effect reversals in the direction of rotation of the motor 60 upon successive energizations thereof.

The movable contact of this switch is operated by an arm 482 which is fixed upon a rotatable switch operating shaft (not shown) in the switch 480. This arm and shaft are rockable from a point at which the arm makes a predetermined angle with the vertical on one side thereof to a corresponding point on the opposite side of the vertical. Shifting of the arm 482 from one position to the other operates to de-energize the motor 60 and to condition its circuit for reversing the flow of current therethrough the next time it is energized thereby to reverse the direction of rotation of the motor. In Fig. 13 the arm 482 is shown in the position it assumes to cause the motor to rotate in a direction to drive the main drive shaft 370 clockwise as seen in that view and in Figs. 19 and 20.

The mechanism for rocking switch arm 482 comprises a finger 484 carried by a base plate 486 adjustably attached to the main drive gear 478 which finger projects axially outwardly of this gear so as to be carried into contact with a cooperating finger 488 on the upper end of switch arm 482 at a predetermined point in the rotation of the main drive shaft 370. The latter finger is biased into co-extensive relation with arm 482 by a spring 490 so that arm 482 tends to move with gear 478 when the finger 484 is carried into engagement with the finger 488. This movement will continue until the arm 482 is carried beyond the vertical whereupon the arm will rock gravitationally to its opposite limit of movement, thus de-energizing the motor 60 and conditioning the same to be operated in the reverse direction the next time it is energized. The biased mounting of the finger 488 allows it to rock far enough so that gear driven finger 484 may pass it should the motor accidentally rotate in the wrong direction or the switch arm 482 become stuck.

In describing the operation of the tilting mechanism 58, it will be assumed that Fig. 13 shows the parts in the position they assume to rotate the main driven shaft 370 clockwise. It will be noted that switch operating finger 484 is at the high point of its course and that switch arm 482 is to the left of the vertical. Fig. 13 also shows the tilting mechanism 58 at the position at which it comes to rest after completing a cycle in either direction.

When the motor is operated in a direction to drive the main drive gear 478 and main drive shaft 370 clockwise, cams 418 and 422 on this drive shaft which cooperate respectively with links 412, 414 and 416 and with lever 424 will be driven in a direction initially to cause rear rock shaft rocking links 412, 414 and 416 to rock the rear rockshaft 376 clockwise as seen in Fig. 13. This continues for approximately half a turn of the main drive shaft but at a negative acceleration.

At the same time the operating rod cams 404 and 406 will be rotated in a clockwise direction thus causing arms 394, levers 398 and links 400 to be operated for a short interval in a direction to contract or shorten telescopic operating rods 380 and thereafter to elongate the same until the main drive shaft 370 has made approximately one-half turn. The simultaneous application of these forces to the forks 364, i. e., clockwise rocking movement and successive contraction and elongation of operating rods 380, causes the forks to be moved in a direction to bring cam followers 430 thereon into engagement with the outer sides of cam slots 432 in the face cams 428. As a result the forks 364 slowly move forward (to the right in Fig. 13) and at the same time tilt counter-clockwise to carry rear arms 366 on the forks toward the horizontal and arms 368 toward the vertical.

This continues until followers 430 are some distance past the low point in cam slots 432. The operating rod elongating and shortening cams 404 and 406 are conformed to effect an abrupt change in the direction of actuation of the operating rod operating linkage 394, 398 and 400 at this time to cause the operating rods 380 to elongate rather than shorten. For an interval thereafter forward movement of the forks 364 is continued at a slower rate while the rate at which the operating rods 380 elongate increases rapidly, thus causing the forks 364 to rise to a position at which rear arms 366 thereon engage the downwardly facing side of the carton 434 on table 40 and the carton is slightly raised bodily from the table, the arms 366 being of sufficient length to extend under the major portion of the length of the downwardly facing side of the carton so that that carton will balance on the forks. This will have occurred when the main shaft 370 has been rotated through approximately one-half turn. By this time the followers 430 will have arrived at the point shown in Fig. 19, i. e., at the upper forward end of cam slots 432. Continued elongation of the operating rods 380 by their elongating mechanism causes the forks 364 to tilt in a clockwise direction about the axis of the followers 430.

At about this time, in other words, after about a half turn of the main drive shaft, the direction of rocking movement of the rear rockshaft 370 is reversed by operation of the rockshaft rocking cams 418 and 422 so that this rockshaft begins to rock counterclockwise rather than clockwise and effects rearward movement of the forks 364. At the same time operating rods 380 are elongating so that the followers 430 are caused to move into the upper horizontal portion of cam slots 432. The continued application of these forces to the forks 364 during the next increment of rotation of main drive shaft 370 causes the forks to tilt in a clockwise direction on the axis of followers 430 and to move toward the rear end of cam slots 432. Operation of the tilting cams 418 and 422 and operating rod telescoping cams 404 and 406 is so correlated and synchronized that the forks 364 will have been tilted clockwise through an angle of 90° as the followers 430 approach the rear end of cam slots 432 as shown in Fig. 20. Moreover, the aperture rod telescoping cams 404 and 406 will then have begun to operate the linkage 394, 398 and 400 in a direction initially slowly to contract the operating rods 380 so that the followers 430 are caused to follow the downwardly curved rear end of the inner side of cam slots 432 thus retracting the forks 364 so that the carton 434 is deposited on the table 40 approximately centered relative thereto as shown in Fig. 20 and resting on what was originally its forwardly facing side. This occurs as the main drive shaft 370 completes approximately ¾ of a turn.

Figure 14:
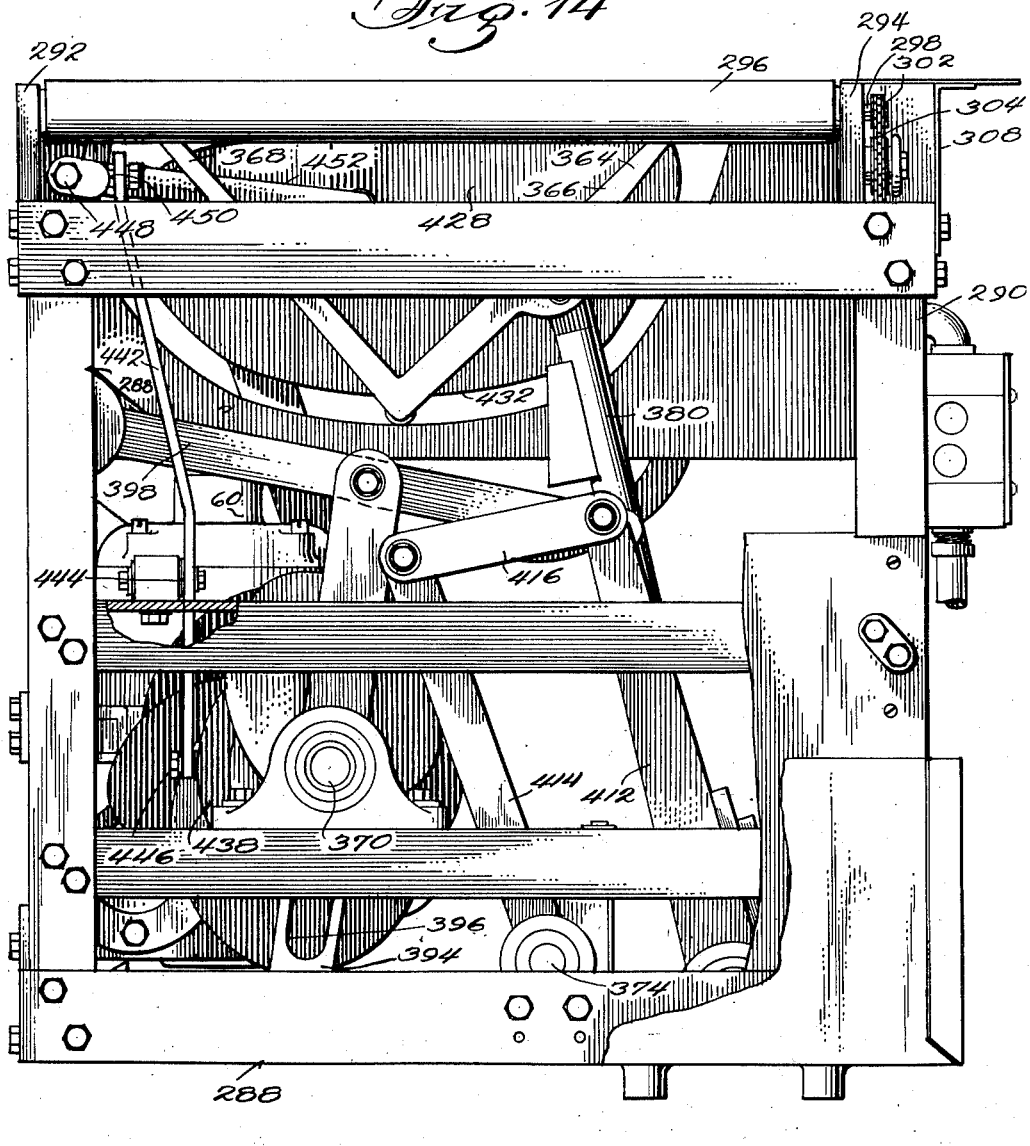
Fig. 14 is a side elevational view of the right side of the apparatus shown in Fig. 12.

At about the time the carton 434 is deposited on the table 40 the trip finger 454 (Fig. 18) on main drive shaft 370 rocks the links 456, 458, and 460 thus rocking shaft 448 and arms 452 counterclockwise as seen in Fig. 14. This occurs while the arms 452 are in the plane of forks 364 so that these arms underlie the arms 368 on the forks 364 and the latter are thus raised or jogged at their forward ends in a direction to tilt forks 364 counterclockwise as seen in Fig. 20. This has no other effect on the operation of the tilting mechanism 58 when the latter is being operated in a direction to turn the forks clockwise as shown in Figs. 19 and 20. Its purpose will be described subsequently.

Continued rotation of the main drive shaft 370 through a complete turn in a clockwise direction results in continued contraction of the operating rods 380 and a reversal in the direction of rocking movement of the rear rock shaft 376 so that the followers 430 on the forks 364 are moved into the downwardly inclined rear portion of cam slots 432 which merge into the forwardly extending part of the slots causing the forks 364 to tilt in a counterclockwise direction while their cam followers 430 are moving along this portion of slots 432. By the time one revolution of the main drive shaft 370 has been completed, this clockwise rocking of the rear rockshaft 376 and contraction of the operating rod 380 brings the forks 364 to a position at which they are fully retracted below the top of table 40.

As the main drive shaft and gear 478 approach completion of one turn, finger 484 (Fig. 13) is carried against arm 482 so that the latter is raised towards the vertical and after being moved to the right of the vertical, it rocks gravitationally to its right hand limit of movement, thus opening the motor circuit and conditioning the same to operate the motor 60 in the reverse direction the next time it is energized.

As a result, the fork operating mechanism and forks will be driven through a cycle of movement the reverse of that just described the next time motor 60 operates. During the first quarter turn of the main drive shaft 370 in the reverse cycle, the fork operating rods 380 will be rocked counterclockwise and elongated so that the forks 364 will be brought approximately to the position shown in Fig. 20 at which the carton 434 on the table 40 is about to be engaged by the forks. At about this time, the direction of rocking movement of rear rockshaft 376 changes from counterclockwise to clockwise and causes the operating rods 380 to be rocked forwardly rather than rearwardly. In addition, at this time or shortly thereafter, finger 454 rocks jogging linkage 456, 458 and 460 in a direction to rock shaft 448 and arms 452 clockwise (Figs. 18 and 20). This raises the forward ends of the forks 364 to assure movement of the followers 430 on these forks out of the rear downwardly inclined portion of the cam slots 432 and into the upper horizontal portions thereof. As the clockwise rocking movement of operating rods 380 continues, the operating rod elongating and shortening mechanism contracts the operating rods. As a result of the forces imparted to the forks by the operating rods 380 and the simultaneous constraining effect of the followers 430 during the course of the movement of the latter from the rear to the front end of the horizontal portions of cam slots 432, the forks 364 and the carton carried thereby are rocked counterclockwise to the position shown in Fig. 19. It will be observed in that view that the carton 434 is about to be brought to rest upon the table 40 centered relative thereto. Since it has been turned 90° counterclockwise, it will be brought to rest on the same side as that on which it originally rested when the forks are subsequently retracted as a consequence of the continued movement of main drive shaft 370 the half turn necessary to complete one revolution thereof counterclockwise.

*Tube mount*

In order to permit inspection of an object on table 40 to be concentrated to such areas of the object as the operator may desire and to vary the perspective of the image produced on the fluorescent screen 46, provision is made for moving the X-ray tube 42 vertically in a plane parallel to the screen, horizontally toward and from the screen and transversely relative to the screen in a horizontal plane. Referring to Figs. 22 to 25, it will be seen that the tube mount for accomplishing this comprises a base cradle or support 492 movable toward and from the screen 46 upon which is mounted a vertically movable intermediate cradle 494 which carries a platform cradle 496 movable transversely of the screen. This tube mount is claimed in United States Letters Patent No. 2,677,517. The base cradle 492 comprises a generally rectangular base frame 498 from the corners of which rise angle shaped columns 500 that are rigidly attached at their lower ends to the corners of the base frame 498. Collars 502 are fixed to the underside of the base frame 498 adjacent its forward and rear edges spaced outwardly of the transverse centerline of the cradle (Fig. 22). These collars are slidably engageable upon parallel guide rods 504 rigidly secured adjacent their opposite ends in opposed pedestals or standards 506 held in fixed position in part by virtue of the fact that they are anchored to the floor 72 of the trailer and in part by front and rear angle iron spacing members 508 attached thereto.

The mechanism for moving the base cradle 492 toward and from the screen 46 comprises a feed screw 510 (Fig. 23) parallel to the guide rods 504 and rotatably supported adjacent opposite ends in suitable bearings 512 mounted on the cross pieces 508 midway between the guide rods 504. A threaded feed nut 514 (Figs. 22 and 24) fixed to the underside of base frame 498 adjacent its center has threaded engagement with the feed screw 510 so that movement of the base cradle along the guide rods 504 may be effected by turning the feed screw. Feed screw 510 is turned in opposite directions by a reversible motor 516 (Fig. 23) of, for example, ½₂ H. P. driving a speed reducer 518 having an output shaft which drives a pinion 520 through a load limit clutch 522. Fixed upon feed-screw 510 adjacent its rear end is a pinion which is driven from the speed reducer pinion 520 by a chain 524 passing over both.

The teeth on the driving and driven elements of the clutch 522 are of complementary generally triangular shape and are yieldingly held in driving engagement by a spring 526 (Fig. 24) so that they are adapted to slip when resistance of the driven element of the clutch to turning exceeds a predetermined maximum torque. Damage to the motor is thus prevented should the movable tube mount strike an obstruction while it is being moved and the operator will be appraised of the fact that the base cradle 492 has been obstructed by the chatter of the slipping clutch elements.

In order automatically to discontinue operation of the drive motor 516 immediately before the base cradle 492 strikes either end of the guideway formed by guide rods 504, a pair of limit switches is provided in the energizing circuit for reversible motor 516. One of these switches automatically discontinues operation of this motor when the base cradle 492 reaches one end of guide rods 504 while the other discontinues operation of the motor in the opposite direction as the base cradle arrives at its other limit of movement. One of these limit switches is shown at 528 in Fig. 22. As there indicated this switch is bolted to a part of the right-hand rear standard 506 so as to be engaged by the rear righthand collar 502 as the frame 492 approaches the rear end of the guideway. A similar switch (not shown) may be similarly mounted on the forward standard.

Like the base frame 492 the vertically movable intermediate frame 494 is of rectangular shape and is made from suitable longitudinal and transverse structural irons suitably interconnected. At diagonally opposite corners this frame is provided with vertically disposed collars one of which is shown at 530 in Fig. 24. These collars are freely slidable upon vertical guide rods 532 fixedly secured in diagonally opposite corners of the base frame 492 by means of collars 534 and 536 mounted respectively on the underside of base frame 492 and the upper end of diagonally opposite columns 500.

Threaded sleeves or feed nuts 538 are secured in the diagonally opposite corners of the intermediate frame 494 not occupied by guide sleeves 530. These feed nuts 538 have threaded engagement with vertically extending feed screws 540 mounted in suitable vertically opposed bearings 542 secured in the diagonally opposite corners of base frame 492 and the upper ends of columns 500 not occupied by the upper and lower collars 534 and 536 respectively. Feed screws 540 are rotated in opposite directions by a reversible electric motor 544 (Fig. 24) of suitable size, such as ½₂ H. P., mounted on the underside of base frame 492. This motor drives a speed reducer 546 which has an output shaft 548 that projects upwardly from the plane of the base frame 492. A pinion 550 (Fig. 25) loosely received upon this output shaft is drivingly connected to it by a load limit clutch 552 (Fig. 24) similar to the clutch 358 on the shield operating mechanism previously described.

Pinion 550 drives a sprocket chain 554 which is drivingly engaged over pinions 556 fixed to the feed screws 540 adjacent their lower ends. This chain is held in driving engagement with the opposite sides of drive sprocket 550 by a pair of idlers 558 (Fig. 25) freely rotatable upon vertically extending studs suitably secured to the base frame 492 on opposite sides of drive sprocket 550. Movement of the intermediate frame 494 is arrested as it approaches either the upper or the lower ends of the guide rods 532 by the action of upper and lower limit switches 560 (Fig. 22) fixed to the outside of one of the columns 500 adjacent the upper and lower ends thereof. As the intermediate frame 494 approaches either the lower or the upper ends of guide rods 532 the movable contact on one or the other of these switches is engaged by a fixed part of this frame thus opening the switch which has been engaged and the circuit which energizes drive motor 544 for operation in the direction it was operating before the switch was tripped.

The third or platform cradle 496 (Fig. 22) in the tube mount comprises a generally rectangular metal plate which has guide collars fixedly secured to its underside adjacent each of the corners thereof. The two front collars are shown at 564 in Fig. 22. These collars are slidable upon guide rods 566 (Fig. 23) extending lengthwise of the intermediate frame 494 and fixedly supported adjacent their opposite ends in standards 568 mounted on the topside of intermediate frame 494 adjacent its corners.

Platform 496 is moved along the guide rods 566 by a feed screw 570 (Fig. 22) rotatably mounted adjacent its opposite ends in suitable bearings 572 on the topside of intermediate frame 494 adjacent its opposite ends between and parallel to the guide rods 566. This feed screw has threaded engagement with a feed nut 574 fixed upon the underside of platform 496 adjacent its mid-point. Feed screw 570 is driven in opposite directions by a reversible electric motor 576 (Fig. 23) of ½₂ H. P. or smaller through a speed reducer 578 and a load limit jaw clutch 580. The load limit clutch 580 is similar to the clutch 358 previously described so as to slip if movement of the platform 496 is impeded. Limits to the sidewise movement of platform 496 under the influence of motor 576 are determined by limit switches 582 (Fig. 23) mounted on the topside of intermediate frame 494 adjacent its opposite ends so that the movable contacts thereof are engaged by the platform 496 as it approaches one or the other of its limits of sidewise movement.

In addition to the limit switches described above for deenergizing the three motors 516, 544 and 576 when their respective cradles are driven to one limit or the other of their movement, a separate manually operable switch to be described is also provided in the circuit of each of the motors in the tube mount to control energization of these circuits so that the tube 42 may be moved at will in any one of the three directions it is movable.

The X-ray tube 42 which may be any suitable liquid cooled high power industrial tube is secured to a base comprising a sheet metal plate 584 (Fig. 22) and suitable bracing such as the bracket 586. The base plate 584 is fixed adjacent its four corners to resilient shock mounts 588 secured on the topside of platform 496. A conventional shutter 590 is provided for the X-ray tube by means of which the portion of the area of an object subjected to X-rays may be reduced to facilitate examination of that particular portion by eliminating the glare of surrounding areas. These shutters may be operated by a cable 592 controlled from the inspection compartment 52.

A suitable coolant such as oil is forcibly circulated between an oil cooler 594 (Fig. 1) on one side of the tube compartment 44 and the tube 42 through suitable conduits 596 connected to the cooler and to a jacket surrounding the X-ray tube 42. These parts, i. e., the cooler and the means for forcing a circulation of oil between the cooler and tube jacket may be of conventional construction and mounted on a suitable frame or standard. Also housed in the tube compartment 44 is a suitable transformer and rectifier 598 of conventional construction for supplying direct current of high voltage to the X-ray tube 42 from an outside source. Flexible cables 600 connect the transformer 598 and suitable contacts on the tube 42. Preferably, the flexible cables 600 and conduits 596 are supported at an intermediate point by a bracket 602 swingably mounted on the wall 64 of the trailer. This bracket suspends the cables and conduits above the floor of the tube compartment 44 in an out-of-the-way position.

*Numbering device*

Also mounted in the tube compartment 44 is a numbering device 604 (Fig. 1) by means of which each object inspected may be marked so that it can be identified after it has been discharged from the trailer. This mechanism comprises a numbering head 606 (Fig. 26) which is conventional in construction and operation. It has an operating stem 608 fixed in the outer free end of a horizontally extending arm 610 on a triangular bracket 612. This arm is secured at its opposite end to the side of a vertically extending tubular leg 614 and is reinforced by an inclined bracing member 616 fixed at opposite ends to the leg and arm. The tubular leg 614 is slidable on a vertically extending guide rod 618 removably secured at opposite ends to top and bottom plates 620 and 622 respectively in a column-like support 624. This support is fixed to appropriately located frame members in the trailer on the rear side of the upper transfer 36 so that the numbering head 606 may be suspended over the end of table 40 adjoining the upper transfer.

Bracket 612 is reciprocated on guide rod 618 to bring the numbering head 606 into and out of operating contact with an object to be numbered by a vertical feed screw 626 rotatably secured at opposite ends in suitable bearings 628 fixed to the top and bottom plates 620 and 622 in the column-like support 624. The feed screw 626 has threaded engagement with a feed nut 630 fixed to the tubular leg 614 on the side thereof diametrically opposite the arm 610.

The feed screw 626 is rotated by a small reversible electric motor 632 (Fig. 27) of, for example, 1/15 H. P. through a load limit jaw clutch 634 (Fig. 26) similar in construction and operation to the clutch 358 in the shield operating mechanism previously described. This clutch has a driven element and a driving element 636 yieldingly urged towards driving position by a suitable spring. Motor 632 is mounted on one side of the feed screw 626 and drives the clutch 634 through a chain 638 passing over a pinion 640 on the motor shaft and the driving element 636 of clutch 634.

In order to provide for adjustment of the tension in the chain 638 the motor 632 is fixed to a hinge mount, including a leaf 642 (Fig. 27) fixed to the side of the column support 624 and a second leaf 644 hinged thereto at 646 so as to be swingable on a vertical axis. Motor 632 is secured at opposite ends to the arms of a generally U-shaped bracket 648 which has its web fixed to the hinged leaf 644. A set or adjusting screw 650 provided with lock nuts to secure the same at a position of adjustment is provided for determining the spacing between the leaves 642 and 644 and thus determining the tension in chain 638.

Operation of the motor 632 is controlled by a plurality of relays some of which are mounted in a housing 652 adjacent the free end of the bracket 612, a limit switch 654 adjacent the free end of the bracket and a second limit switch 656 mounted on the tubular leg 614 which is adapted to engage an abutment adjacent the upper end of the supporting column 624. Operation of the motor 632 is initiated at a predetermined point in the cycle of operation of the indexing conveyor system, i. e., immediately before a cycle of operation of this system comes to an end by a relay in the control circuit for the indexing conveyor system. When operated, this relay closes a circuit which operates the motor in a direction to drive supporting bracket 612 and operating head 606 downwardly eventually bringing the head into contact with the object 434 to be numbered which, at that time has come to rest on the table 40 constituting the examining station. During the course of the numbering operation, the head telescopes relative to the stem 608 in a known manner and at approximately the limit of this movement the frame of the head 606 trips the movable contact of limit switch 654 which thereupon de-energizes the motor 632 and after an interval sufficient to arrest the motor energizes the winding in the motor for operating the latter in a reverse direction so that feed screw 626 is turned in a direction to raise supporting bracket 612 on the guide rod 618. As this bracket and the head 606 near fully raised position switch 656 on the bracket 612 engages the fixed abutment 658 opening the circuit to the motor so that the bracket 612 and head 606 come to rest at an elevated position. Access to the numbering device for adjustment or repair is had through the door 102 (Fig. 1) in the side wall 64 of the trailer. It should be noted that this numbering device will operate to number a carton or the like on table 40 irrespective of its size without requiring adjustment.

The mechanism just described consecutively numbers the objects passing through the trailer, and in order for the operator in the inspection compartment 52 to be apprised of the number of the object which is being examined a counter 660 (Fig. 29) is provided on a control panel 662 in the inspection compartment 52. This counter is driven by suitable means in synchronism with the indexing conveyor system so that it indicates by number the number of the object at the inspection station 40.

Working compartments

As previously explained, the trailer is provided with a horizontal wall 86 (Fig. 1) cooperating with transverse walls 50 and 78 to define working compartments including the light-proof inspection compartment 52 separated from the lightproof plate developing compartment 76 by the transverse wall 74. Access to these compartments is had through the door 94 in the side wall 62 of the trailer and the door 96 in the wall 74 which leads from the latter compartment to the inspection compartment 52.

The common wall 50 between the latter compartment and the tube compartment 44 is of composite construction comprising spaced plywood panels 664 and 666 (Fig. 28) secured by suitable means to vertically extending frame members in the trailer such, for example, as the frame members 668. Except for the opening 48 previously mentioned which extends through both of these panels, the common wall 50 is made X-ray impervious by providing a sheet of lead 670 of suitable thickness on the inner side of panel 664. A sheet of lead 672 is also provided on the longitudinal wall 86 extending rearwardly from the junction of this wall with common wall 50 for a distance sufficient to intercept X-rays which might be reflected against this wall from the X-ray tube compartment 44.

Extending outwardly from the opening 48 in the common wall 50 is the combined fluorescent screen and cassette holder 56 which comprises a generally tubular member 674 of rectangular contour having a peripheral flange 676. This flange is attached to the panel 666 in common wall 50, by any suitable means so that the tubular member 674 projects into the inspection compartment 52. Adjacent its free end, the fluorescent screen 46 is fixed in this member 674 between a Plexiglas supporting panel 678 and one or more sheets of leaded glass 680 of sufficient thickness to intercept X-rays emitted by the tube so as to protect the operator while the screen 46 is being viewed. Accidental escape of X-rays through the combined holder 56 is avoided by extending the lead sheet 670 on wall panel 664 into the opening 48 and tubular member 674 so that it forms a lining therefor. Moreover, if necessary, additional protection may be afforded where needed by additional thicknesses of lead at those points as shown.

Along one side wall, the combined holder member 56 is provided with an opening between the screen 46 and inner wall panel 666. Aligned with this opening and extending both inside and outside the holder 56 is a cassette holder rack which includes upper and lower rails extending transversely of the tubular member 674 and similar rails longitudinally aligned therewith on the inner side of the inner wall panel 666. The lower rails of these racks are shown fragmentarily at 682 and 684 while the upper rail on the wall panel 666 is indicated at 686 in Fig. 29. These rails have aligned grooves 688 (Fig. 28) to guide movement of a cassette holder 690 (Fig. 29) into and out of the combined cassette and screen holder 56 through the opening in the side wall thereof. The upper rails of these racks are similarly grooved.

Figure 29:
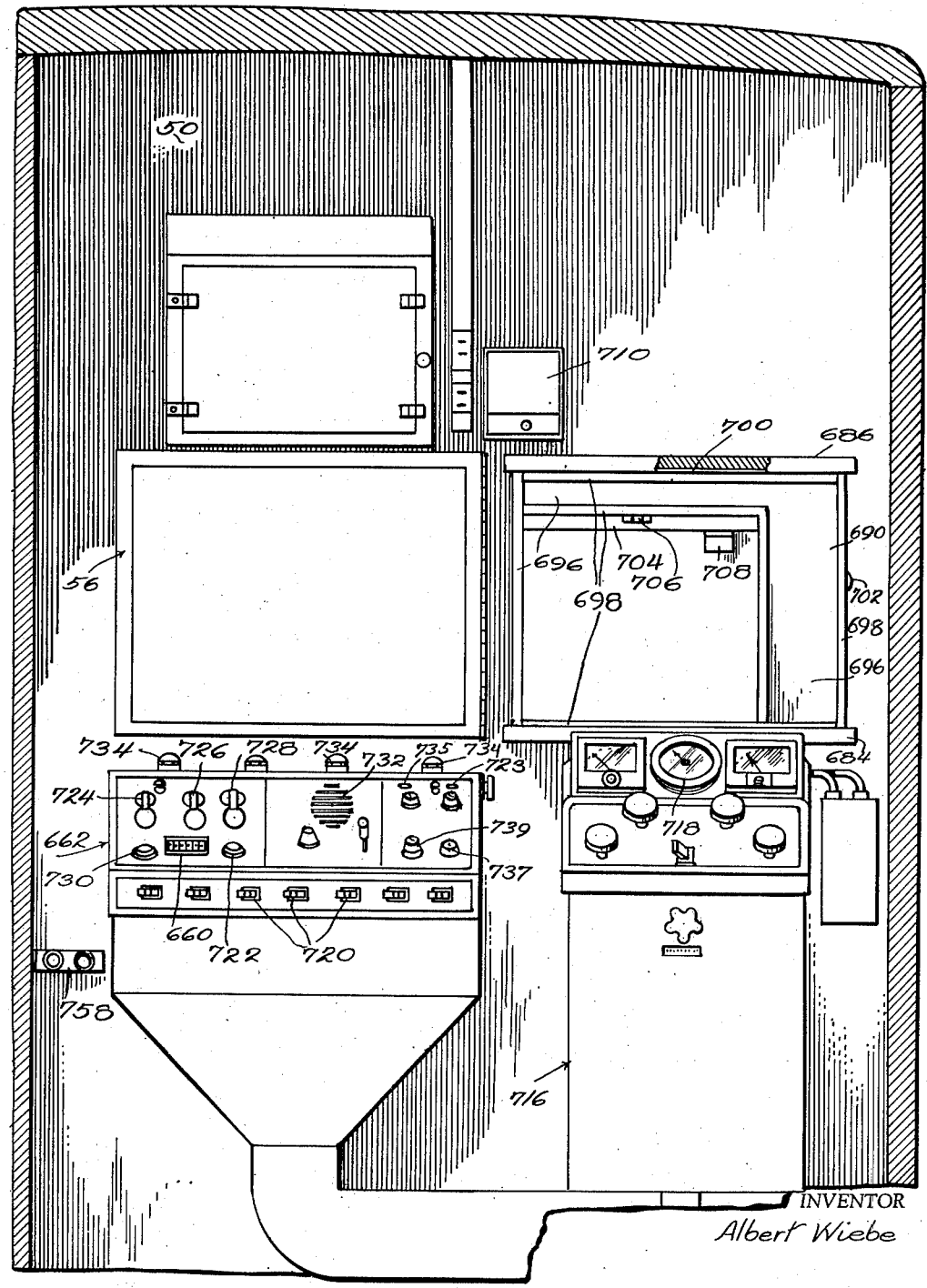
Fig. 29 is a front elevational view on an enlarged scale looking in the direction of the arrows on the line 29—29 of Fig. 2.

The opening in the combined holder member 56 is protected by a lead coated door 692 (Fig. 28) hinged upon a vertically extending hinge 694. The cassette holder 690 comprises a plurality of wood rails 696 arranged to form an open generally rectangular frame as seen in Fig. 29. These rails are reinforced by angular sheet metal strips 698 of appropriate cross sectional shape and size snugly to engage the rails. The junction between the various reinforcing strips 698 are welded together so that a rigid structure is thus formed. Extending longitudinally of the upper and lower rails in the cassette holder are projecting ribs 700 which are adapted to engage in the longitudinal grooves 688 in the top and bottom rails in the cassette holder rack. To facilitate withdrawal of the cassette holder 690 from within the combined screen and cassette holder, the cassette holder is provided with a retractible pull 702 in its righthand end rail as seen in Fig. 29.

Cassettes or radiographic plates are confined in the opening defined by side rails of the cassette holder 690 by the free ends of the metal reinforcing strip 698 on the bottom rail of the cassette holder which extends upwardly above the topside of this rail and confine the lower edge of the plates and by a depending flange 704 on the upper rail in the holder against which the top edge of the plate is pressed by a biased releasable detent 706 of any suitable construction anchored to the top rail of the cassette holder 690. Along one of the inner edges of the cassette holder a clip 708 is provided for removably holding X-ray impervious letters or numbers which show up in exposed radiographs so that the latter may be identified. A supply of these numbers or letters may be kept in a box or holder 710 fixed to the common wall 50.

In addition to the equipment above described, the inspection compartment 52 may be provided with suitable cabinets 712 (Figs. 1 and 2) for storing a supply of cassettes at a position within easy reach of an operator at the viewing station in front of screen 46. At this station a seat 714 preferably is provided. Along the common wall 50 are provided control panels including an X-ray tube control panel 716 (Fig. 29) and the main control panel 662. The tube control panel 716 contains the controls for regulating current flow and voltage to the X-ray tube 42 and the controls necessary for making radiographs such as automatic timer 718.

The main control panel 662 includes a plurality of individual switches 720, one in the energizing circuits for each of the separate motors in the device which must be set at a predetermined position to effect automatic operation of the device. In addition there is a push button switch 722 to control energization of the circuit for the electromagnetic clutch and thus control commencement of a cycle of operation of the indexing conveyor system and a manual switch 723 for controlling energization of indexing conveyor motor 54 which normally runs constantly when the device is in use. Separate manually operable drum switches 724, 726 and 728 are provided for the three motors 576, 516 and 544 respectively in the tube mount for moving the tube in three directions as described. Each of these switches is angularly rockable between a position at which the circuit for its respective motor is de-energized and opposed positions at which the motor operates in reverse directions. Thus, the operator may shift the position of the tube 42 at will.

There is also a push button switch 730 on this panel to initiate operation of the tilting mechanism 58 at will and certain auxiliary equipment such as an intercommunication system 732 and four panel lights 734 along with a switch 735 to make and break the circuit to these lights. These lights include a light which lights when the lower transfer 34 is blocked, a light to show completion of the operation of tilting mechanism 58, a light to show that the front door 90 is open and a light to show that the X-ray tube control panel 716 has been set to cause high voltage to be applied to the X-ray tube 42 under the control of one or the other of two switches 737 and 739 on the control panel 662. The latter switch may be set at one of two positions to provide for either automatic or manual control over energization of the X-ray tube. When set at automatic, the switch 739 controls a circuit which automatically applies high voltage to the X-ray tube upon completion of a cycle of the indexing conveyor system provided the door 90 and closure shield 336 in the tube compartment are in closed position. This circuit remains energized until the push button switch 722 is operated to initiate a cycle of operation of the indexing conveyor system at which time the X-ray tube is automatically de-energized. When the switch 739 is set at manual, high voltage will be supplied to the X-ray tube only while the push button switch 737 is pressed and then only if the door 90 and closure shield 336 are in closed position, interlocking controls being provided in the energizing circuit for the X-ray tube and the closure shield operating motor 356 to prevent energization of the X-ray tube while the closure shield 336 is open. A suitably located limit switch (not shown) of conventional construction prevents energization of the X-ray tube with high voltage when the door 90 in the tube compartment is open.

In the developing compartment 76 are provided storage cabinets 736 (Fig. 2) for the developed radiographs and for materials used in developing the same along with appropriate film processing tanks 738 and a film drier 740. If desired a viewer 742 to facilitate viewing of radiographs may be provided in a convenient location on one wall of this compartment, and a similar viewer may be provided in the inspection compartment 52 above the combined screen and cassette holder 56.

The rear equipment compartment 82 houses an air conditioning unit diagrammatically shown at 744 in Fig. 1 which supplies fresh air to the inspection and developing compartments 52 and 76 respectively through suitable conduits (not shown) along with a generator 746 and an internal combustion engine 748 for operating the generator. The generator 746 supplies current for the lights in the inspection and plate developing compartments 52 and 76 to the processing tanks 738 and to the blower in the air conditioner so that radiographs may be developed without requiring connection of the trailer to an outside source of current.

A water tank 750 is also provided in the rear compartment for storing the water used in developing radiographs. This tank has an extensible outlet 752 in the developing compartment 76 for supplying water at environmental temperature, and at various locations. This tank also supplies water to a conditioning unit 754 (Fig. 2) under the processing tanks 738 which maintains the water in these tanks at a predetermined temperature as required properly to process exposed radiographic plates.

The rear equipment compartment 82 also has a gasoline tank 760 from which motor 748 and such heating units as are necessary to the operation of the device are supplied with fuel. This compartment also contains a reel 756 upon which a heavy duty cable is reeled. This cable may be connected at its free end to an outside source of current of relatively high voltage for supplying current to the X-ray tube transformer 598 and to the motors for operating the indexing conveyor system, tilting mechanism 58, the tube mount and the numbering machine 604.

Operation

Briefly to describe the operation of the inspection device in inspecting cartons of canned goods, it will be assumed that the doors 90, 102 and 336 (Figs. 1 and 10) are closed so that the tube compartment 44 is sealed against the escape of X-rays. It will further be assumed that the extension conveyors 158 and 322 have been lowered to operative position. Preferably the inspection and development compartments 52 and 76 respectively are made lightproof and closed to each other by closing doors 94 and 96 since these compartments are both provided with suitable artificial lights 762 (Fig. 2) for illuminating the interior thereof as desired while the trailer is being prepared for making inspections. Switches 723 and 735 are then turned on commencing operation of conveyor motor 54, and energizing panel lights 734. Tube switch 739 also is set to provide for automatic or manual operation of the X-ray tube 42, it being assumed that the voltage to the tube and other necessary adjustments have been made on the X-ray control panel 716. Each of the four panel lights by being either on or off then indicate that everything is in order for automatic operation. The system is then indexed a sufficient number of times to bring a carton to each position which forms a stage in the step-by-step operation of the device.

For this purpose, cartons are manually loaded on the side of inlet conveyor 30 (Figs. 1 and 3) which is uphill relative to the stop 32. Operation of the push button switch 722 (Fig. 29) on control panel 662 closes the circuit for the electromagnetic combined clutch and brake 222 (Fig. 7) causing the brake to release and the clutch to engage. As a result, shaft 200 is driven, through chain 226 in a direction to move the upper flights 184 of the duplicate conveyor chains 38 from the lower transfer 34 towards the upper transfer 36. This movement of the conveyor chains 38 incidentally rotates the shaft 148 and drives the stop roller cam 138 (Fig. 3) on this shaft clockwise. As previously explained, this cam is so formed in contour and so positioned on the shaft 140 that the stop 32 will move to retracted position only once during each cycle of operation of the system and this retraction occurs near the end of the cycle. Furthermore, it remains retracted only long enough to release one carton.

It is also to be noted that the flights 184 (Fig. 7) on duplicate conveyor chains 38 are spaced at such intervals that the lower transfer 34 is free of flights when a carton is released by stop 32 so that the released carton is free to gravitate to the lower transfer 34 and thus a carton will be present on this transfer as each cycle of operation comes to an end. To obtain the desired automatic operation, it is further necessary that the spacing of the flights 184 on duplicate conveyor chains 38 and the lineal speed of these chains be so correlated that the leading edge of the leading carton on these conveyor chains is short of engagement with the upper transfer 36 upon termintaion of a cycle of operation of the indexing conveyor system and another flight on conveyor chains 38 is just short of engaging the carton on lower transfer 34 so that this carton will be engaged by this flight during the succeeding cycle of operation and thus the indexing conveyor system will be replenished. At this same time, i. e., between cycles, a carton will be centered upon the table 40 at a position to be examined. Stationing of a carton at the latter position is effected by the correlated action of the upper transfer 36 and the conveyor rollers 296 (Fig. 8) in the table 40 which action will now be described.

As previously explained, the duplicate transfer chains 238 (Figs. 8 and 9) in the upper transfer 36 are driven from the motor 54 by a system of chains, shafts and gears which has previously been described. These duplicate transfer chains carry a single flight 252 from right to left on their upper run as seen in Fig. 9 and also drive the switch tripping finger 282 and the chain 304 which positively drives the conveyor rollers 296 in the table 40 in a direction to move a load thereon toward the discharge runway or conveyor 310. For this reason, initial operation of the indexing conveyor system causes the carton on table 40 to move toward the discharge conveyor 310. Since operation of the indexing conveyor push button switch 722 energizes the circuit to the motor 356 (Fig. 10) for opening and closing the protective shield 336 as well as the clutch circuit, the protective shield will commence to rise as soon as a cycle of operation of the indexing conveyor system commences and will have been stopped at fully raised position by switch 362 by the time the carton on the table 40 has been moved far enough by conveyor rollers 296 to render gravity outlet conveyor 310 effective to discharge the same from the trailer.

While this is occurring, the leading carton on the duplicate conveyor chains 38 is being moved onto the upper transfer 36 (Fig. 8) and the flight 252 carried by duplicate transfer chains 238 is moved from right to left along the lower reach of these chains so that it is inoperative. Prior to the midpoint of a cycle the leading carton on duplicate chains 38 will have been fully delivered to the upper transfer 36. The transfer flight 252 thereafter becomes operative to move this carton from this transfer towards the table 40 while other cartons are brought by the duplicate conveyor chains 38 towards the upper transfer 36.

The operation of these mechanisms is further coordinated to cause a relay in the circuit of the motor for protective shield 336 to be operated automatically during the latter portion of the cycle of operation of the indexing conveyor system for energizing this motor and thus causing the protective shield to move toward closed position. Moreover, as the trip finger 282 (Fig. 9) completes one revolution, it opens the movable contact of switch 284 thus opening the circuit for clutch 222 (Fig. 7) and thereby terminating a cycle of operation of the indexing conveyor system. However, as a cycle of operation is terminating, a relay in the circuit of numbering machine motor 632 (Fig. 27) is automatically operated thus closing the circuit to this motor so that the numbering head 606 (Fig. 26) is driven downwardly into operative contact with the stationary carton 434 on table 40. Since the limit switch 654 adjacent this head is operated incident to the movement of the head in numbering a carton, a reversal in the direction of motor operation ensues thus returning the numbering head toward its initial position. As it approaches this latter position, the limit switch 656 is operated, thus opening the circuit to the numbering machine motor 632 so that the motor comes to rest when the head is in elevated position.

Should a jam occur on the lower transfer 34 for any reason as by a carton not being fully delivered to this transfer, it will be carried against the switch 228 (Fig. 6) in the initial phase of movement of duplicate conveyor chains 38. This opens the energizing circuit for the electromagnetic clutch 222 (Fig. 7) so that the drive to duplicate conveyor chains 38 is interrupted. At the same time the circuit to one of the signal lamps 734 (Fig. 29) on panel 662 is closed thus apprising the operator of the location of the difficulty.

Since initiation of a cycle of operation is under the complete control of the operator through push button switch 722 a carton at the table or inspection station 40 may be examined at leisure not only in the position at which it is delivered to this station but at the position to which it may be turned by the tilting mechanism 58 already described. Assuming that the controls on the X-ray tube control panel 716 have been adjusted so that X-rays capable of penetrating the type of carton being examined will be emitted by the tube 42 when high voltage is supplied thereto, the application of this high voltage to the tube is thereafter under the complete control of the operator through the push button switches 737 and 739. Thus, the tube may be energized whenever desired and for any interval desired providing the doors 90 and 102 and shield 336 in the tube compartment 44 are in closed position.

As previously explained as a precautionary measure, interlocking controls (not shown) of conventional construction are provided in the high voltage circuit of the X-ray tube 42, the circuit for the electromagnetic clutch 222, the circuit for the operating motor 356 for shield 336 and a circuit including limit switches controlled by tube compartment door 90 to prevent energization of the X-ray tube should the indexing conveyor system or the shield motor be operating or should the door 90 be open. Whether or not this door is open will normally be indicated by one of the panel lights 734 on control panel 730 and energization of the tube 42 will be indicated by another panel light 734 on this panel. The interlocking controls likewise prevent the electromagnetic clutch 222 and the shield motor 356 from being energized while high voltage is being applied to the X-ray tube 42 and break the connection to the high voltage source should an attempt be made to open door 90.

Normally examination of objects on the table 40 will be made fluoroscopically by the operator seated in the seat 714 before the control panel 662. By means of the three switches 724, 726, and 728 (Fig. 29) the operator may center the tube 42 at will behind selected areas of the carton or other object being examined at various distances behind the object and thus secure a more distinct image of a particular area. Furthermore, this changing of the position of the tube relative to the object on the table 40 changes the perspective of the image on the screen 46 and thus may make observable when the tube is at one position conditions in the carton or other object which cannot be observed when the tube is at other positions. By the use of shutters 590 (Fig. 22) previously mentioned, it is possible to limit very greatly the extent of the area being examined. By thus limiting the area subjected to X-rays attention is not distracted from this area by a surrounding glare which would be present if the area subject to X-rays were not shuttered down. The shutters 590 are operated by a manual control 758 (Fig. 29) adjacent control panel 662.

Cartons subject to rejection may be identified since their number will be indicated on the counter 660 mounted on the control panel 662 and this may be communicated to the outside through the intercommunication system which has a transmitter on the control panel.

In case radiographs of an object on the table 40 are desired, the X-ray tube 42 is first brought to a position at which the desired image appears on the screen 46 and the tube then de-energized. After a cassette has been placed in the cassette holder 690 the door 692 is opened and the cassette holder moved through this open doorway into the portion of the cassette holder rack housed in the combined screen and cassette holder 56 so that the radiographic plate extends across this combined holder in a plane parallel to the screen 46. After the door 692 has been closed, the radiographic plate may be exposed, the timer 718 automatically controlling the length of exposure. Since the radiographic plates are developed by conventional processes, a description thereof is believed to be unnecessary.

After examination of the carton or other object in the position at which it is delivered to the table 40 has been completed, it may be discharged from the trailer by operating the indexing conveyor system through a cycle or it may be turned to permit examination on another plane through the object or carton. If it is not to be turned, the indexing conveyor push button switch 722 is pushed to start another cycle of the indexing conveyor system thus discharging the carton upon which the examination has been completed and bringing the next carton on the indexing conveyor system into examining position.

If it is desired to examine the carton along another plane through the same, the tilting push button 730 is pressed momentarily. This energizes the motor 60 (Fig. 12) for operation in a direction to turn the carton or other article forwardly through 90° as previously described so that its top side faces the screen 46 whereupon the motor 60 automatically comes to rest. Examination and radiographing of the carton may then proceed in the manner previously described.

At the conclusion of the examination of a carton in turned position, it is usually preferable that it be returned to its original position before being discharged from the trailer. This is accomplished simply by again depressing the tilting push button 730 momentarily. On this second cycle of operation, the tilting mechanism 58 is driven in the reverse direction to that it was first driven as previously explained so that the carton is brought to rest on its bottom side on table 40. Thereafter the device is ready for another cycle of operation.

From the above description of the construction and operation of the improved inspection apparatus of the present invention, it will be apparent that it has the advantage of operating almost completely automatically but nevertheless under the control of the operator in the inspection compartment 52. Assuming the toggle switches 720 (Fig. 29), panel light switch 735, X-ray tube switch 739 and indexing conveyor system motor switch 723 and the various control mechanisms on the X-ray tube control panel 716 have been set, the device will thereafter operate entirely automatically. All that the operator need do to bring a carton or other object to be inspected to the table 40 which forms the inspecting station is to press the push button switch 722 momentarily. This will cause the indexing conveyor system to operate through a complete cycle and automatically come to rest when a carton or other object is deposited on the table 40. Such operation is possible by virtue of the fact that the drive motor 54 (Fig. 7) for this system operates constantly once the manual switch 723 is moved to on position, and the push button switch 722 merely operates to cause clutch 222 to move to engaged position while the trip finger 282 (Fig. 8) automatically terminates a cycle by virtue of the fact that it opens switch 284 in the energizing circuit for the clutch after a predetermined interval of operation.

It is also to be noted that cartons or other objects will always be deposited on the table 40 oriented in a predetermined manner relative to the screen 46 so that objects as deposited are ready to be examined. By virtue of the control which the operator has over initiation of a cycle of operation of the indexing conveyor system, examination may continue through any interval the operator desires. When examination in the plane at which an object is deposited on the table 40 is completed, the object may be examined in another plane at the option of the operator since he can determine whether or not it shall be turned due to the fact that operation of the tilting mechanism 58 is controlled by push button switch 730. Once this switch is operated, the tilting mechanism operates through a cycle during which the object on table 40 is turned through 90° and it then automatically comes to rest with all of its operating mechanism positioned below the level of the top of table 40. By use of this tilting mechanism, it is possible to view the object on the table in planes corresponding to a side and an end view and each view is free from the intrusion of foreign images since forks 364 are below the top of table 40. It is to be noted that the X-ray tube may remain energized while the tilting mechanism 58 is operating so that the object being inspected may be watched while it is being turned.

After examination in the second position has been completed, it is preferable that the object be returned to its initial position before being discharged from the trailer particularly if it is a carton of canned food or a carton of bottles. This is accomplished simply by again pressing push button switch 730 momentarily. This will cause tilting mechanism 58 to operate in a reverse direction to turn the object on the table 40 back through 90°.

It is to be noted, therefore, that by virtue of the mode of operation of the apparatus of the present invention a novel method of radiologically examining objects may be practiced in which objects may be examined on two different planes for any desired interval and then either returned to their original position before being moved to a place of discharge or else discharged without return to their original position. This method is particularly advantageous for use in the examination of packaged canned goods such as canned foods and may be used even on packages or cartons containing more than one row of cans or bottles. In such an examination not only is the liquid level in the individual cans or containers clearly discernible but other conditions in the individual containers are brought out such as the existence of bubbles, separation of ingredients in a container, cellular structure, and the presence of foreign material such as solder, etc. In addition, the condition of the cans or bottles in a package is clearly discernible. Obviously, a broken bottle will show up. In the case of cans such conidtions as continuity of seams and variations in normal shape due to internal pressure or to dents resulting from rough handling or inadequate packaging will appear.

When the presence of such unwanted conditions is suggested on an image, the true condition may be made more readily discernible by centering the X-ray tube 42 opposite the particular area in the object which is suspect. This is readily accomplished by manipulation of the three manually operable drum switches 724, 726, and 728 on the main control panel 662. Moreover, shutters 590 (Fig. 23) may be adjusted from inspection compartment 52 by means of the control 758 beside the control panel 662.

Since each object is numbered by the numbering device 604 (Fig. 26) and the totalizer 660 (Fig. 29) shows the number of the object on table 40, the assistants outside the trailer may be informed of objects to be rejected over the intercommunication system 732 which provides a means for establishing communication between the interior and exterior of the trailer. It will be recalled that the numbering device 604 is designed to number any size object without requiring adjustment so as to make the inspection apparatus more fully automatic in operation.

In certain instances, it may be desirable to make a permanent record of a particular object, for example, for future reference to illustrate the existence of a particular condition in or about the object. With the improved apparatus of the present invention, radiographs may readily be made. Not only that but they may be developed in the apparatus even though a source of outside current and water is not available. Water is supplied from tank 750 (Fig. 2) to the film processing tanks 738 and this water in the processing tanks is maintained at the proper temperature by electrically operated conditioning apparatus 754 supplied with current by the internal combustion engine operated generator 746. This generator also supplies current for the lights 762 in the various compartments when they are needed.

While a preferred embodiment of the invention has been shown and described, it will be apparent that numerous variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

1. Inspection apparatus comprising a source of X-ray emanations, X-ray sensitive image-forming means in the effective range of the X-ray emanations from said source, means for moving an object to be inspected to and supporting the same at a first predetermined position of rest in the field of emanations between said source and X-ray sensitive means, and means for shifting the object to and from a second predetermined position of rest in substantially the same locus in said field to vary the orientation of the object in the field and thereby vary the image of the object produced on said image forming means.

2. Inspection apparatus as defined in claim 1 in which said object moving means and said object shifting means are each individually operable at the will of an operator.

3. Inspection apparatus comprising a source of X-ray emanations, X-ray sensitive image producing means in the effective range of the X-ray emanations from said source, and means for bringing an object to be inspected from a source of supply into the field of emanations between the source and X-ray sensitive means and fixedly positioning the same in the said field including means at will to turn the object in equal increments to predetermined positions of rest located at substantially the same locus in the field of X-ray emanations.

4. Inspection apparatus comprising an X-ray tube, X-ray sensitive image producing means operatively positioned relative to said tube, means for moving an object to be inspected to and fixedly supporting the same at a first predetermined position of rest in the field of emanations between said tube and X-ray sensitive means so as to orient the same in a predetermined manner relative to the tube and X-ray sensitive means, means for relatively moving said tube, X-ray sensitive means and object at will to effect a reorientation of the object relative to the tube and X-ray sensitive means at substantially the same locus in the field so as to vary the image of the said object produced on said X-ray sensitive means.

5. Apparatus for making X-ray examination of generally rectangular shaped objects comprising a source of X-ray emanations, fixed X-ray sensitive image forming means operatively disposed relative to said source, means for moving the object to be inspected from a source of supply to a fixed position in the field between said source and image forming means resting upon one side thereof with a pair of sides parallel to said X-ray sensitive means, and means for turning the object between said position and a position at which it rests upon one of said pair of sides and said first-mentioned side is parallel to said X-ray sensitive means for varying the image of the article produced on said X-ray sensitive image forming means.

6. Examination apparatus comprising a source of X-ray emanations, X-ray sensitive image forming means in the effective range of the X-ray emanations from said source, cyclically operable object conveying means for positively moving objects to be examined one at a time to a first position of rest in the field between said source and said X-ray sensitive means during each cycle of the said conveying means, and means to shift the object at said first position to and from a second position in substantially the same locus in said field for varying the image of the object produced on said X-ray sensitive means, said shifting means assuming a position of rest wholly removed from the field of X-ray emanations between the source and X-ray sensitive means.

7. Examination apparatus as defined in claim 6 in which said object conveying and said object shifting means are each individually operable at the will of an operator.

8. Inspection apparatus comprising a source of X-ray emanations, an X-ray impervious housing for said source of X-rays having a plurality of openings including entrance and exit openings for the ingress and egress of objects to be inspected and an opening opposite said source, X-ray sensitive means operatively disposed relative to the X-ray emanations passing through said latter opening, means under the control of an operator for positively moving objects from a source of supply of objects external to said housing through said entrance to a first predetermined position of rest in the field between said source of emanations and the opening opposite thereto one at a time oriented in a predetermined manner relative to the plane of said X-ray sensitive means, and means under the control of the operator to shift an object in said field to and from a second predetermined position of rest in substantially the same locus in said field to vary the sides of the object confronting said X-ray source and the opening opposite thereto and thereby vary the image of the object produced on said X-ray sensitive means.

9. Inspection apparatus comprising a source of X-ray emanations, an X-ray impervious housing for said source of X-rays having a plurality of openings including shielded entrance and exit openings for the ingress and egress of objects to be inspected and an opening opposite said source, X-ray sensitive means operatively disposed relative to the X-ray emanations passing through said latter opening, cyclically operable object moving means for positively moving objects to be inspected from a source of supply external to the housing along a predetermined course between the entrance and exit passing through the field between said source and X-ray sensitive means, said means also operating positively to orient said objects so that they are passed into said field oriented in a predetermined manner relative to said X-ray sensitive means, means for controlling operation of said object moving means including a manual control to initiate operation thereof and an automatic control to interrupt operation thereof upon arrival of an object at a first predetermined position in the said field, and means controlled by the operator to shift the object in said field at will to and from a second predetermined position in substantially the same locus in the field to reorient the object relative to said X-ray sensitive means.

10. Inspection apparatus comprising an X-ray tube, fixedly mounted X-ray sensitive image forming means on one side of said tube, means for positioning an object to be inspected in the field of X-ray emanations between the X-ray tube and X-ray sensitive means including means to shift the object between first and second positions of rest angularly displaced from each other but in substantially the same locus relative to said X-ray sensitive means, and a mount for said X-ray tube including a plurality of relatively movable cradles for effecting movement of said tube in a plurality of normally related directions selectively to bring the tube into operative relation with the object and X-ray sensitive means and thus facilitate selective inspection of the object at either of its positions of rest.

11. Inspection apparatus comprising an X-ray tube, fixedly mounted X-ray sensitive image forming means on one side of said tube, means for positioning an object to be inspected in the field of X-ray emanations between the X-ray tube and X-ray sensitive means including means to shift the object between first and second positions of rest angularly displaced from each other but in substantially the same locus relative to said X-ray sensitive means, a mount supporting said X-ray tube for movement in a plurality of directions selectively to locate the tube in operating relation with the object to be inspected and to said screen, and shutters for stopping down the X-rays emanating from said tube so as to limit inspection of an object to areas thereof of limited cross sectional extent.

12. Inspection apparatus comprising an X-ray tube, fixedly mounted X-ray sensitive image forming means on one side of said tube, means for positioning an object to be inspected in the field of emanations between the X-ray tube and X-ray sensitive means including means to shift the object between first and second positions of rest angularly displaced from each other but in substantially the same locus relative to said X-ray sensitive means, a mount for said X-ray tube including a plurality of cradles movable relatively vertically, fore and aft and in lateral directions to bring the tube into operative relation with the object and screen and thus facilitate selective inspection of objects, and remotely controlled power operated means for moving the cradles in the aforesaid directions.

13. X-ray inspection apparatus comprising a housing including an X-ray impervious compartment and a light-proof inspection compartment separated by a common wall having an opening therein, an X-ray tube in said tube compartment opposite the opening in said common wall, X-ray sensitive means in said inspection compartment disposed to be affected by the X-rays passing through the opening in said common wall, means for moving objects to be inspected from an external source of supply through said housing under the control of an operator in said inspection compartment including means fixedly to position objects in the field between said tube and X-ray sensitive means, a mount including a plurality of motor operated cradles for moving the tube vertically, in fore and aft and in lateral directions, and controls in said inspection compartment for manually controlling the direction of movement of the cradles.

14. In an X-ray inspection apparatus having an X-ray tube and an X-ray impervious housing provided with a plurality of openings including an opening opposite said tube and shielded entrance and exit openings so that a completely inclosed chamber for the X-ray tube is defined by the housing the combination comprising, an X-ray sensitive image forming means external to the chamber and operatively disposed relative to the X-ray emanations from said tube passing through the opening in said housing opposite the said tube, means for moving objects to be inspected from a source of supply external to the housing by stages between said entrance and exit, said object moving means being manually controlled to initiate operation thereof and automatically controlled to interrupt operation thereof upon arrival of the objects at said stages, one of the stages being in the field between said tube and screen, and means for identifying objects in said field including a power operated marking device in said housing retractable to an inoperative position out of marking contact with objects to be inspected, means for controlling operation of said marking device including a control operable conjointly with said object moving means to initiate operation of the marking device effective to move the same into marking contact with an object to be inspected at a predetermined stage in the passage of objects through the housing and to reverse the drive to the marking device in response to marking of an object so as to retract the same, and a visual indicator adjacent said screen operable in coordinated relation with the marking device to display to an operator the marking on the object in said field.

15. Inspection apparatus as defined in claim 14 wherein the marking device is a numbering machine operable to number consecutive objects consecutively and the visual indicator is a counter.

16. In a self-contained X-ray inspection unit a housing in which objects may be positioned for radiographic or fluoroscopic inspection having wall structure defining an X-ray impervious compartment and an adjoining light proof inspection compartment and including wall structure separating said compartments from each other with an opening therein, an X-ray tube in said X-ray impervious compartment positioned to direct X-rays through said opening, a combined cassette and screen holder including X-ray impervious wall structure projecting from the opening in said separating wall into said inspection compartment and defining a closed periphery, a fluorescent screen in said holder operatively disposed relative to the emanations from said tube, said holder having an opening in one side thereof between said screen and said separating wall, and a cassette holder slidable through said opening into and out of the space in said combined cassette and screen holder between said screen and tube to adapt the cassette holder for loading and unloading from the inspection compartment.

17. In a self-contained X-ray inspection unit a housing in which objects may be positioned for radiographic or fluoroscopic inspection having wall structure defining an X-ray impervious compartment and an adjoining light-proof inspection compartment including wall structure separating said compartments from each other with an opening therein, an X-ray tube in said X-ray impervious compartment positioned to direct X-ray emanations through said openings, a combined cassette and screen holder including X-ray impervious wall structure projecting from the opening in said separating wall into said inspection compartment and defining a closed periphery, a fluorescent screen in said holder operatively disposed relative to the emanations from said tube, said holder having an opening in one side thereof between said screen and said separating wall, transverse track structure in said holder between the screen and X-ray tube aligned with the opening in said holder, a cassette holder slidable upon said track structure through said opening into and out of the space in said combined cassette and screen holder between said screen and tube to adapt the cassette holder for loading and unloading from the inspection compartment, and an X-ray impervious door for the opening in said holder accessible from the interior of said inspection compartment.

18. In a self-contained X-ray inspection unit a compartmented housing including an X-ray impervious compartment and a lightproof inspection compartment adjacent thereto having a wall common with said tube compartment provided with an opening, an X-ray tube in said tube compartment opposite said opening, X-ray sensitive means in said lightproof compartment positioned to be affected by the X-ray emanations passing through said opening, said housing having entrance and exit openings in one wall thereof one of which communicates with said tube compartment and the other of which communicates with the housing on the side of said inspection compartment remote from said tube compartment, means in said housing including a portion of said tube compartment forming a generally U-shaped passageway circumscribing said inspection compartment between the two openings in said housing, and means under the control of an operator for moving objects to be inspected through said passageway so as to pass the same through the field of X-ray emanations between said tube and X-ray sensitive means including means fixedly to position objects to be inspected in the field between said tube and X-ray sensitive means.

19. In a self-contained X-ray inspection unit a partitioned housing including adjacent X-ray impervious and lightproof inspection compartments having a common wall with an opening therein, an X-ray tube in said X-ray impervious compartment opposite said opening, X-ray sensitive image producing means in said lightproof compartment operatively positioned relative to the X-ray emanations passing through the opening between said compartments, means for imparting to objects to be inspected step by step movement through said housing from a source external thereto and effective individually to position the said objects at a predetermined locus in the field between said tube and X-ray sensitive means for periods of time controlled by the operator, and independently operable independently controlled means for moving said tube and the object at said predetermined locus relative to said X-ray sensitive means selectively to effect a reorientation of the object relative to the X-ray sensitive means while substantially maintaining its locus in the said field and selectively to center the tube opposite different areas of the object thereby to vary the image produced on said X-ray sensitive means.

20. In a self-contained X-ray inspection unit a partitioned housing including adjacent X-ray impervious and lightproof inspection compartments having a common wall with an opening therein, an X-ray tube in said X-ray impervious compartment opposite said opening, X-ray sensitive means in said lightproof compartment operatively positioned relative to the X-ray emanations passing through said opening, a gravity inlet conveyor for objects to be inspected, said inlet conveyor being located in the housing on the side of said inspection compartment opposite said tube compartment, a gravity outlet conveyor in said housing for said tube compartment, cyclically operable means in said housing partially encompassing said inspection compartment for conveying objects from the inlet conveyor to the outlet conveyor through the field of X-ray emanations between said tube and X-ray sensitive means including means to discharge one object to said outlet conveyor during each cycle of said object conveying means and to position successive objects in said field in successive cycles of said conveying means oriented in a predetermined manner relative to said X-ray sensitive means for periods controlled by the operator in said inspection compartment together with means operating in synchronized relation with said object conveying means to release one object from said inlet conveyor during each cycle of said object conveying means, and means under the control of an operator to effect a reorientation of the object in said field relative to said X-ray sensitive means while substantially maintaining its locus in the field to vary the image of the object produced on said X-ray sensitive means.

21. In a mobile self-contained X-ray inspection unit a compartmented trailer including an X-ray impervious compartment, a lightproof inspection compartment having a wall common therewith provided with an opening and a lightproof plate developing compartment having a wall common with the inspection compartment provided with a doorway through which communication may be had between said inspection and developing compartments, X-ray sensitive image producing means in said inspection compartment operatively positioned relative to the X-rays passing through the opening in the common wall between the tube and inspection compartments, means for positioning objects from an external source of supply at a predetermined locus in the field between the tube and X-ray sensitive means, independently operable means for relatively moving the tube, X-ray sensitive means and object at said predetermined locus selectively to vary the image produced on the X-ray sensitive means and the centering of the tube relative to the object, and control means in the inspection compartment for independently controlling movement of the relatively movable parts.

22. In a mobile self-contained X-ray inspection unit a compartmented closed trailer including an X-ray impervious compartment, a lightproof inspection compartment adjacent thereto having a wall common with the tube compartment provided with an opening and a lightproof plate developing compartment having a wall common with said inspection compartment provided with a doorway through which communication may be had between said inspection and developing compartments, a combined fluorescent screen and cassette holder in said inspection compartment operatively positioned relative to the X-rays passing through the opening in the common wall between the tube and inspection compartments, means in said trailer forming a passageway circumscribing said lightproof compartments, said trailer having openings in its outer walls to form an entrance and exit to said passageway, means for moving objects to be inspected through said passageway so as to pass the same through the field of X-rays generated by said tube including means fixedly to position objects to be inspected in the field between said tube and said combined holder, independently operable means for shifting said tube and the object at said fixed position selectively to effect a reorientation of the object relative to the combined holder and selectively to center the tube opposite the said object thereby to vary the image produced, and independent controls in said inspection compartment for said object shifting means and tube moving means.

23. In a mobile self-contained X-ray inspection unit a compartmented trailer including an X-ray impervious compartment, a lightproof inspection compartment having a wall common therewith provided with an opening, a lightproof plate developing compartment having a wall common with the inspection compartment provided with a doorway through which communication may be had between said inspection and developing compartments and an auxiliary equipment compartment, X-ray sensitive image producing means in said inspection compartment operatively positioned relative to the X-rays passing through the opening in the common wall between the tube and inspection compartments, means for positioning objects from an external source of supply at a predetermined locus in the field between the tube and X-ray sensitive means, independently operable means for relatively moving the tube, X-ray sensitive means and object at said predetermined locus selectively to vary the image produced on the X-ray sensitive means and the centering of the tube relative to the object, control means in the inspection compartment for independently controlling movement of the relatively movable parts, plate developing means in said developing compartment, electric lights in all of the said compartments, a motor operated electric current generator in said auxiliary equipment compartment for supplying current to the lights and to said plate developer, and a water tank in said auxiliary compartment to supply water to said plate developer.

24. The method of substantially simultaneously inspecting a plurality of cans or like objects packaged in boxes or cartons which comprises moving said packages of said cans or the like one at a time to a first predetermined position in the field between a source of X-ray emanations and an X-ray sensitive image producing means with the axis of said cans or the like disposed in predetermined planes relative to the plane of said X-ray sensitive means, immovably supporting said package at said position for any desired interval to cause a composite image showing the structure and contents of all of the cans or the like in a package to be produced on said image producing means, examining said image for evidence of defects in the structure or contents of individual cans or the like in the package, then turning the said package in said field through a predetermined angle to a second predetermined position in substantially its original locus in the said field to vary the image of the individual cans or the like in the composite image produced on said X-ray sensitive means, immovably supporting said package or the like at said position for any desired interval and then examining the composite image for evidence of defects in the structure or contents of the individual cans or the like in the package not discernible in the first composite image.

25. The method of substantially simultaneously inspecting a plurality of cans or like objects packaged in boxes or cartons which comprises moving said packages one at a time to a first predetermined position in the field between a source of X-ray emanations and an X-ray sensitive image producing means with the axis of the cans or the like in said packages disposed in predetermined planes relative to the plane of said X-ray sensitive means, immovably supporting said package at said first position for any desired interval to cause a composite image showing the structure and contents of all of the cans or the like in a package to be produced on said image producing means, examining said image for evidence of defects in the structure or contents of individual cans or the like, then turning the said package in said field through a predetermined angle to a second predetermined position in substantially its original locus in the said field to vary the image of the individual cans or the like in the composite image produced on said X-ray sensitive means, immovably supporting said package at said second position for any desired interval, then examining the composite image for evidence of defects in the structure or contents of the individual cans or the like not discernible in the first composite image, and when said examination is completed returning said package to a position at which it rests on its original side of rest.

26. The method of substantially simultaneously inspecting a plurality of cans or like objects packaged in boxes or cartons which comprises successively fixedly positioning a package at positions of rest in the field of X-ray emanations between an X-ray tube and an X-ray sensitive image forming means first on one of its sides and then on another of its sides at one time to produce a composite image on the X-ray sensitive means corresponding to a side view of the cans or the like in the package and at another time to produce a composite image on the X-ray sensitive means corresponding to an end view of the cans or the like, examining the composite images for evidence of defects of the structure or contents of the individual cans or the like, and when said examination has been completed returning said package to its original position of rest.

27. The method of substantially simultaneously inspecting a plurality of cans or like objects packaged in boxes or cartons which comprises successively fixedly positioning a package at positions of rest in the field of X-ray emanations between an X-ray tube and an X-ray sensitive image forming means first on one of its sides and then on another of its sides at one time to produce a composite image on the X-ray sensitive means corresponding to a side view of the cans or the like in the package and at another time to produce a composite image on the X-ray sensitive means corresponding to an end view of the cans or the like, examining the composite images for evidence of defects in the structure or contents of the individual cans or the like, relatively moving the X-ray tube, X-ray sensitive means and package to vary the relative positions thereof and thereby vary the perspective of the image produced on said X-ray sensitive means, and when said examination has been completed returning said package to its original position of rest.

28. Inspection apparatus comprising an X-ray tube, X-ray sensitive image forming means in the effective range of the X-rays emanating from said tube, means to support an object to be inspected in the field of X-rays between said source and X-ray sensitive means, means to bring an object to be inspected to a first predetermined position of rest on the supporting means oriented in a predetermined manner relative to the said field, and means for shifting the object on said supporting means to and from a second position of rest in substantially the same locus in said field to vary the orientation of the object in the field and thereby vary the image of the object produced on said image forming means by the X-rays impinging thereon.

29. Inspection apparatus comprising an X-ray tube, X-ray sensitive image forming means in the effective range of the X-rays from said tube, an object support between said tube and X-ray sensitive means including a fixed horizontally extending supporting surface upon which objects to be inspected may be brought to rest, means for positioning objects to be inspected on said supporting surface at a first position of rest oriented in a predetermined manner relative to the field of X-rays between said tube and X-ray sensitive means, and object shifting means movable to and from an inoperative position wholly out of the field of X-ray emanations encompassed by said X-ray sensitive means for shifting an object from said first position of rest to a second position of rest in substantially the same locus in said field thereby to vary the orientation of the object in the field.

30. Inspection apparatus comprising a source of X-ray emanations, X-ray sensitive image forming means in the effective range of the X-ray emanations from said source, means for positioning an object to be inspected at a first predetermined position of rest in a zone of inspection located in the field of emanations between the source and X-ray sensitive means, means for shifting the object to and from a second predetermined position of rest in substantially the same locus in said inspection zone to vary the orientation of the object relative to the field and thereby vary the image of the object produced on said image forming means and means operating in synchronism with said object positioning means for removing inspected objects from the inspection zone in advance of the delivery of an object to said zone by said positioning means.

31. Inspection apparatus as defined in claim 30 in which said object positioning and object removing means operate independently of said object shifting means and under the independent control of the operator so that objects may be removed from the inspection zone irrespective of whether or not they have ben shifted to the second predetermined position.

References Cited in the file of this patent
UNITED STATES PATENTS

| | | |
|---|---|---|
| 1,617,758 | Heynemann | Feb. 15, 1927 |
| 1,985,715 | Bucky | Dec. 25, 1934 |
| 2,058,826 | Reece | Oct. 27, 1936 |
| 2,099,185 | Adrian | Nov. 16, 1937 |
| 2,135,019 | Struck | Nov. 1, 1938 |
| 2,169,483 | Adrian | Aug. 15, 1939 |
| 2,179,859 | Page | Nov. 14, 1939 |
| 2,217,262 | Tunnicliffe | Oct. 8, 1940 |
| 2,298,942 | Hicks et al. | Oct. 13, 1942 |
| 2,360,326 | Adrian et al. | Oct. 17, 1944 |
| 2,456,816 | Daly | Dec. 21, 1948 |
| 2,512,465 | Moorhouse | June 20, 1950 |
| 2,538,217 | Sussin et al. | Jan. 16, 1951 |
| 2,554,051 | Newton | May 22, 1951 |
| 2,575,295 | Renner | Nov. 13, 1951 |
| 2,576,862 | Smith et al. | Nov. 27, 1951 |
| 2,582,776 | Greenberg | Jan. 15, 1952 |
| 2,687,477 | Pfaff | Aug. 24, 1954 |

FOREIGN PATENTS

| | | |
|---|---|---|
| 436,745 | Great Britain | Oct. 17, 1935 |